United States Patent [19]

Wu

[11] Patent Number: 5,502,783
[45] Date of Patent: Mar. 26, 1996

[54] POLARIZATION INDEPENDENT OPTICAL DIRECTIONAL COUPLER WAVELENGTH TUNABLE FILTERS/RECEIVERS

[75] Inventor: Chi Wu, Nepean, Canada

[73] Assignee: Northern Telecom Limited, Montreal, Canada

[21] Appl. No.: 292,205

[22] Filed: Aug. 18, 1994

[51] Int. Cl.$^6$ .................................................. G02B 6/26
[52] U.S. Cl. ............................... 385/42; 385/24; 385/41; 385/46
[58] Field of Search ............................ 385/42, 24, 44, 385/41, 46, 31

[56] References Cited

U.S. PATENT DOCUMENTS

| | | | |
|---|---|---|---|
| 4,746,587 | 7/1988 | Sano et al. | 385/31 |
| 5,117,469 | 5/1992 | Cheung et al. | 385/11 |
| 5,293,439 | 3/1994 | Mori et al. | 385/42 X |

FOREIGN PATENT DOCUMENTS

| | | | |
|---|---|---|---|
| 0604894 | 7/1994 | European Pat. Off. | 385/42 |
| 2251957 | 7/1992 | United Kingdom | 385/43 |

OTHER PUBLICATIONS

Heismann et al. "Polarization–independent wavelength filter using a grating–assisted vertical directional coupler in InP". Appl. Phys. Letter 64, May 1994 pp. 2335–2337.
"Vertical Forward Coupler Based Channel–Dropping Photodector", Sakata et al, 1994 American Institute of Physics, Appl. Phys. Lett., 64, 7 Mar. 1994, pp. 1201–1203.
"Directional Coupers Made of Nonidentical Asymmetric Slabs. Part I: Synchronous Couplers", Marcuse, IEEE Journal of Lightwave Technology, vol. LT–3, No. 1, Jan. 1987.
"Tunable Optical Waveguide Directional Coupler Filter", Alferness et al, 1978 American Institute of Physics, Appl. Phys. Lett. 33(2), 15 Jul. 1978, pp. 161–163.
"A Novel Integrated Optics Wavelength Filter in InGaAsP–InP", Broberg et al, 1986 IEEE Journal of Lightwave Technology, vol. LT–4, No. 2, Feb. 1986, pp. 196–203.
–"Broadly Tunable InGaAsP/InP Buried Rib Waveguide Vertical Coupler Filter", Alferness et al, 1992 American Institute of Physics, Appl. Phys. Lett. 60,(8), 24 Feb. 1992, pp. 980–982.
"Grating–Assisted InGaAsP/InP Vertical Codirectional Coupler Filter", Alferness et al, 1989 American Institute of Physics, Appl. Phys. Lett. 55(9), 6 Nov. 1989, pp. 2011–2013.
"Polarization–Independent Acoustically Tunable Optical Filter", Smith et al, 1990 American Institute of Physics. Appl. Phys. Lett., vol. 56, No. 3. 15 Jan. 1990, pp. 209–211.
"Wavelength Tuning in a Grating–Assisted Vertical Coupler Filter Using Quantum Well Electrorefraction", Sakata et al, 1991 American Institute of Physics, Appl. Phys. Lett. 59(24), 9 Dec. 1991, pp. 3081–3083.
"InGaAsP/InP Vertical Directional Coupler Filter with Optimally Designed Wavelength Tunability", Wu et al, 1993 IEEE Photonics Technology Letters, vol. 4, No. 4, Apr. 1993, pp. 457–459.
"Bandwidth of Forward and Backward Coupling Directional Couplers", D. Marcuse, Journal of Lightwave Technology, vol. LT3, No. 12, Dec. 1987, pp. 1773–1777.
"A Vertically Coupled InGaAsP/InP Directional Coupler Filter of Ultranarrow Bandwidth", Wu et al, IEEE Photonics Technology Letters, vol. 3, No. 6, Jun. 1991, pp. 519–521.

(List continued on next page.)

Primary Examiner—John D. Lee
Assistant Examiner—Phan T. H. Palmer
Attorney, Agent, or Firm—George MacGregor

[57] ABSTRACT

A polarization independent tunable filter/receiver for optical communications. The tunable filter, operating as a directional coupler, has three waveguides including a central, feedguide and a pair of branch waveguides. Through either electro-optic effects or free carrier injection, the TM and TE polarization modes of the central wavelength can be coupled from the feedguide to the appropriate branch guide. The separated modes can be either detected independently or reunited in phase for further processing.

34 Claims, 21 Drawing Sheets

OTHER PUBLICATIONS

"Directional Couplers Made of Nonidentical Asymmetric Slabs. Part II: Grating–Assisted Couplers", D. Marcuse, Journal of Lightwave Technology, vol. LT–5, No. 2, Feb. 1987, pp. 268–273.

"Polarization–Independent Wavelength Filter Using A Grating–Assisted Vertical Directional Coupler in InP", Heismann et al, 1994 American Institute of Physics, Appl. Phys. Lett. 64(18), 2 May 1994, pp. 2335–2337.

"Contradirectional Frequency–Selective Couplers For Guided–Wave Optics", Yeh et al, Applied Optics, vol. 19, No. 16, 15 Aug. 1980, pp. 2848–2855.

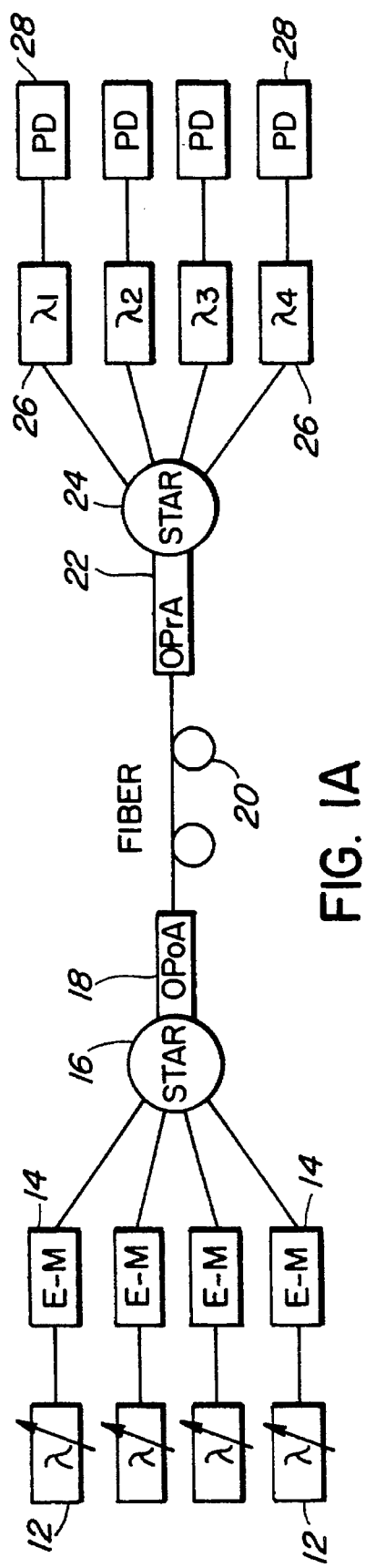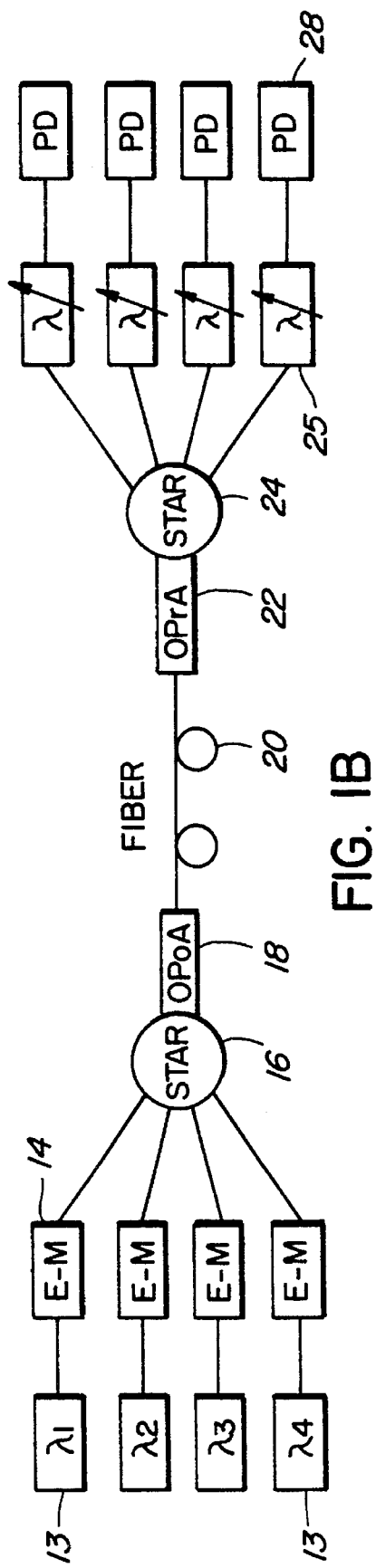

POLARIZATION INDEPENDENT OPTICAL DIRECTIONAL COUPLER WAVELENGTH TUNABLE FILTERS/RECEIVERS

FIELD OF THE INVENTION

This invention relates to an optical wavelength tunable filter and more particularly a directional coupler tunable filter/receiver which is polarization independent.

BACKGROUND OF THE INVENTION

It has been suggested that the requirement for bandwidth in the public telecommunications network doubles about every two years ("Gigabit Networking on the Public Transmission Network", James A. McEachern, IEEE Communications Magazine, Vol. 30, No. 4, April 1992, pp. 70–78). The Synchronous Optical Network (SONET) OC-48 System (2.488 Gb/s) has been in service since 1992 which would imply that a bandwidth of 10 GB/s will be required by 1996 to meet demands. In the aforementioned article by James A. McEachern, it is indicated that in spite of current transmission rates in excess of 2 Gb/s less than 0.1% of the potential capacity of a single mode optical fiber is being exploited. The potential optical bandwidth available on single-mode fiber in the 1200 to 1700 nm low loss window is reported to be as much as 60 Tb/s.

Although bandwidths of up to 10 Gb/s have been demonstrated the practical upper limit of such a system has not yet been determined. Optical transmitters utilizing modulated lasers and optical modulators are capable of bandwidths to 10 Gb/s and beyond but other system elements such as optical detectors and electronic components are seen as potential limiting factors.

Since single-mode fiber has already been widely installed it follows from an economic perspective that it is advantageous to more fully utilize existing networks rather than routing additional fiber links. One method of more fully utilizing existing fiber while operating within the potential bandwidth limitation of 10 Gb/s is to deploy wavelength division multiplexing (WDM). By this process the bandwidth range within the low-loss window of 1200 to 1700 nm is partitioned into a plurality of discrete wavelength channels each potentially carrying a 10 Gb/s bandwidth. Each modulated wavelength carrier is multiplexed at the transmitter end and the composite signal is caused to propagate through the single-mode fiber. At the receiver end the composite signal is demultiplexed into the individual wavelength carriers and transferred to appropriate detectors.

A WDM access network may be established in at least two ways as shown in FIGS. 1A and 1B. According to the network of FIG. 1A, tunable lasers are employed to generate several discrete wavelength channels. Each wavelength channel is modulated by the external modulator and the individual, modulated channels are multiplexed into the fiber via the star coupler. At the receiver end the individual wavelength carriers are separated by preselected narrow band filters and read by photodetectors. The second network shown in FIG. 1B relies on fixed wavelength lasers to generate the wavelength carriers. These carriers are modulated by the external modulators and multiplexed into the fiber. At the receiver end a tunable filter is used to separate individual wavelength carriers.

Because optical fibers have a random polarization property the central carrier wavelength at the receiver end will include both transverse electric TE and transverse magnetic TM polarization modes. Generally, the wavelength selective coupling of the TE polarized mode in a directional coupler wavelength filter occurs at a longer wavelength than does coupling of the TM polarized mode. The difference in wavelength between the two modes can be 30 nm or more and hence an optical filter with a narrow bandwidth is unable to process both modes.

Prior Art

Tunable optical wavelength filters have been described in the prior art. For example, Wu et al ("InGaAsP/InP Vertical Directional Coupler Filter with Optimally Designed Wavelength Tunability", IEEE Photonics Technology Letters, Vol. 4, No. 4, April 1993) describe a directional coupler having an electrically controlled tuning range >73 nm and a narrow bandwidth of approximately 1.5 nm. This filter is, however, polarization dependent. F. Heismann et al ("Polarization-Independent Wavelength Filter Using a Grating-Assisted Vertical Directional Coupler in InP", Applied Physics Letters, 1994, Vol. 64, No. 18, p. 2335), disclose a filter designed to accommodate random polarization properties. The filter, however, is not tunable. As a passive filter, its polarization independent wavelength selective performance is sensitive to fabrication imperfections.

Accordingly, in order to successfully implement the network illustrated in FIG. 1B, there is a requirement for a polarization independent, tunable filter.

SUMMARY OF THE INVENTION

It is an object of the present invention to provide an optical wavelength tunable filter/receiver.

It is a further object of the present invention to provide a polarization independent optical wavelength tunable filter/receiver.

It is yet another object of the present invention to provide a directional coupler, polarization independent optical waveguide tunable filter/receiver.

It is a still further object of the present invention to provide such a filter/receiver in a semiconductor structure.

Therefore in accordance with a first aspect of the present invention there is provided an optical directional coupler wavelength tunable filter. The tunable filter has a first waveguide adapted to receive and transfer therethrough an optical signal. A second waveguide is also provided, the second waveguide having at least a portion of its length in juxtaposition to the first waveguide. There is also a third waveguide having at least a portion of its length in juxtaposition to the first waveguide. Finally, means are provided in association with the waveguides to selectively couple portions of the optical signal from the first waveguide to the second and third waveguides.

In accordance with more specific aspects of the invention the optical signal, containing a plurality of discrete wavelength channels each having TM and TE polarization mode, is launched into the first waveguide. Each of the second and third waveguides is tuned individually to selectively couple the TM mode of a specific wavelength to one of the second and third waveguides and the TE mode of the same wavelength to the other of the second or third waveguides.

In a preferred embodiment a tunable filter/receiver is fabricated in a III–V alloy system such as InGaAsP/InP although it is within the scope of the invention to employ other semiconductor and hetero-material systems such as II–IV alloys or Si/Ge. Also, other photorefractive, acousto-optic and electro-optic materials may be considered.

The second and third waveguides also identified herein as branch guides may be provided with appropriate gratings so as to propagate the coupled wavelength in the same direction as the launched signal, i.e., co-directional or reverse direction, i.e., contra-directional.

Other objects, advantages and improvements in accordance with the present invention will become apparent from the following detailed description.

BRIEF DESCRIPTION OF THE DRAWINGS

The invention will now be described in detail with reference to the attached drawings wherein:

FIGS. 1A and 1B illustrate schematically wavelength division multiple access networks;

DETAILED DESCRIPTION OF THE INVENTION

Figure 2:
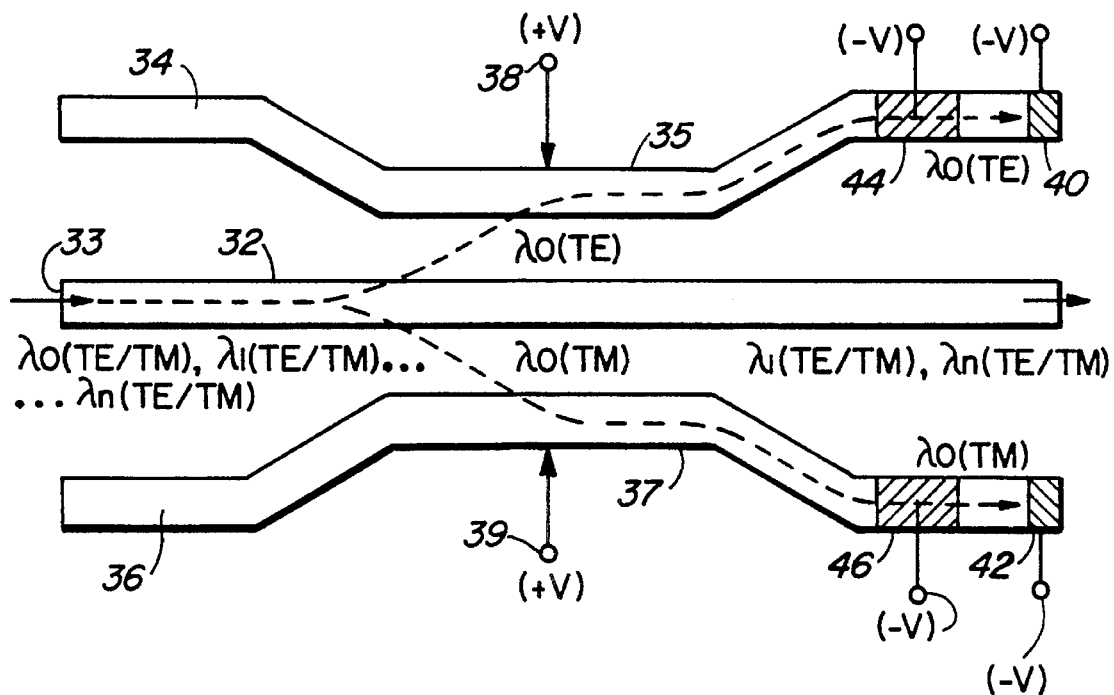
FIG. 2 is a plan view of one embodiment of a tunable filter/receiver of the present invention.

The tunable filter/receiver of the present invention finds particular application in an optical communication network. The network shown in block diagram form in FIG. 1A includes a bank of tunable lasers 12 at the transmitter end, each laser tuned to a different preselected central wavelength. External modulators 14 impart electrical signals to each central wavelength and the individual signals are multiplexed onto the fiber link 20 via a star coupler 16 and amplified by an optical post-amplifier 18. At the receiver end the multiplexed signals are amplified in the pre-amplifier 22 stage and demultiplexed by the star de-coupler 24 and narrow-band fixed wavelength filters 26. The demultiplexed signals are read by the individual broadband photodetectors 28 or integrated photodetectors.

Due to random polarization introduced by the fiber, the optical signal at the receiver end will include transverse electric (TE) and transverse magnetic polarization modes having a wavelength differential of as much as 30 nm. In the network illustrated in FIG. 1A, the narrow band fixed filters 26 are unlikely to pass both TE and TM modes and hence the network is considered to be polarization dependent.

In the network illustrated in FIG. 1B, a plurality of fixed wavelength lasers 13 are chosen as optical sources, and the central wavelength including both polarization modes are demultiplexed at the receiver end. It is the tunable filter/receivers 25, 28 in FIG. 1B that are the subject of the present invention.

Referring now to FIG. 2, there is shown in plan view a diagrammatic representation of a tunable filter/receiver structure according to one embodiment of the present invention. The filter/receiver includes central waveguide 32 which has a receiving end 33 to which is supplied the optical signal containing a plurality of central wavelengths $\lambda_0, \lambda_1, \lambda_2 \ldots \lambda_n$. Each central wavelength may also include TE and TM polarization modes and hence, the incoming optical signal may be written as $\lambda_0, \lambda_{0TE}, \lambda_{0TM}; \lambda_1, \lambda_{1TE}, \lambda_{1TM}; \ldots \lambda_n, \lambda_{nTE}, \lambda_{nTM}$.

It is known that for a directional coupler having two waveguides with propagation constants $B_1$ and $B_2$ there is a wavelength $\lambda_0$ at which the propagation constants are equal. For this condition light launched into one of the waveguides is completely coupled into the other waveguide after travelling a fixed distance. See, for example, Wu et al, "A Vertically Coupled InGaAsP/InP Directional Coupler Filter of Ultranarrow Bandwidth", IEEE Photonics Technology Letters, Vol. 3, No. 6, June 1991, pp. 519–21, the disclosure of which is incorporated herein by reference. It is also known that by injecting current into one of the waveguides the propagation constant of that waveguide can be changed. Hence the directional coupler can be tuned so as to select the precise wavelength which is to be coupled from one waveguide to the other. See Wu et al, "InGaAsP/InP Vertical Directional Coupler Filter with Optimally Designed Wavelength Tunability", IEEE Photonics Technology Letters, Vol. 4, No. 4, April 1993, pp. 457–9, the disclosure of which is incorporated herein by reference.

The present invention represents an improvement over the devices of the prior publications in that the tunable filter/receiver includes a third waveguide which can be tuned independently of the first and second waveguides. In one embodiment of the invention the central or feed waveguide 32 is the lower waveguide and the tunable waveguides or branch waveguides 34, 36 are laterally spaced from each other and vertically spaced from the central waveguide. This configuration is shown in FIG. 2. As indicated previously, for certain conditions, light from one waveguide will be completely coupled to the other waveguide after travelling a certain distance. In FIG. 2 it will be apparent that the branch waveguides 34, 36 are configured so as to have a portion 35, 37 respectively which lie in juxtaposition to the central or feed waveguide 32 for a portion of its length. This length is designed such that the light once coupled into the branch waveguide is not coupled back to the central waveguide.

In operation the optical signal containing the central wavelength channels and polarization modes is launched into the central waveguide at 33. The waveguides are designed such that the middle or feed waveguide 32 has a different index of refraction than the branch waveguides 34, 36. By selectively injecting current into the individual branch waveguides it is possible to independently tune each so as to couple $\lambda_{0TE}$ into one waveguide and $\lambda_{0TM}$ into the other. This current is injected via contacts 38, 39 on waveguides 35, 37 respectively. As will be described later herein a negative or reverse voltage applied to contacts 38, 39 will also change the refractive index of each branchguide. In this structure it is necessary that the propagation constant of each branch waveguide be different so as to satisfy the following conditions:

$$B_L, TE(\lambda_0) = B_M, TE(\lambda_0)$$

$$B_R, TM(\lambda_0) = B_M, TM(\lambda_0)$$

where:
$B_L$=propagation constant of left guide,
$B_M$=propagation constant Of middle guide,
$B_R$=propagation constant of right guide,
$\lambda_0$=central wavelength or the coupling wavelength of the filter.

Figure 3:
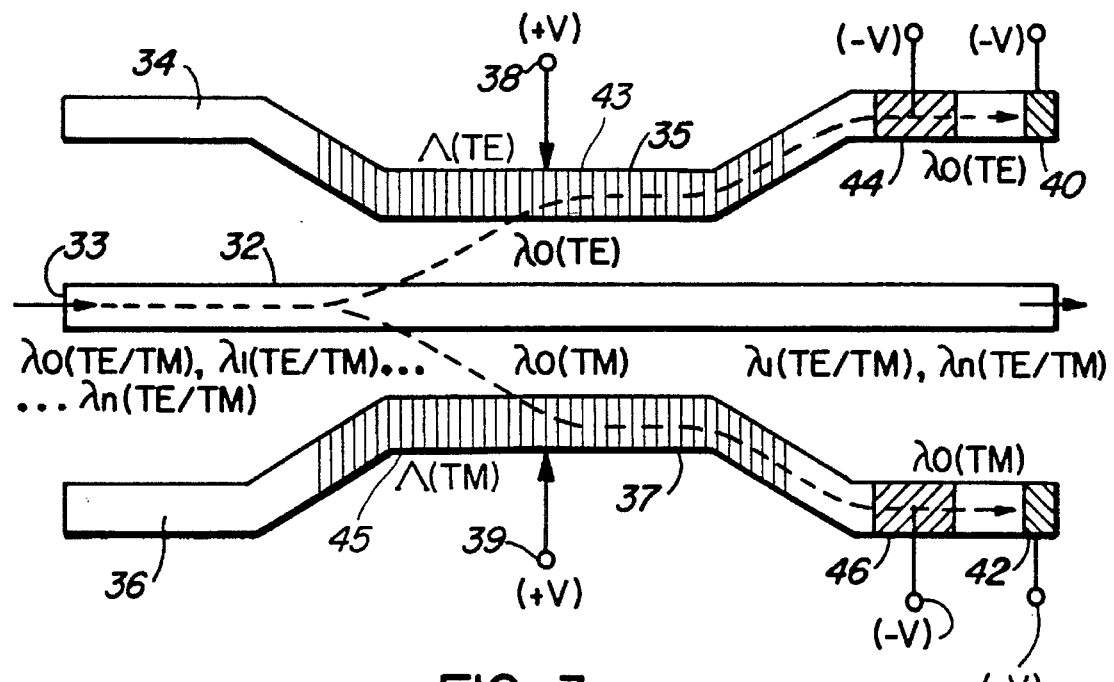
FIG. 3 is a variation of the embodiment of FIG. 2 employing branch-guide gratings.

The preferred method of achieving different propagation constants is to tailor the geometry of the branch guides i.e., different widths or different thicknesses. As an alternative to the aforementioned configuration, coupling can be effected by means of gratings 43, 45 as illustrated in FIG. 3. In this embodiment the two branch waveguides can have the same or different propagation constants. The phase matching condition is satisfied by using different grating periods on the branch guides. The phase matching conditions are given by:

$$B_L, TE(\lambda_0) - B_M, TE(\lambda_0) = 2\frac{\pi}{\Lambda} \quad (TE)$$

$$B_R, TM(\lambda_0) - B_M, TM(\lambda_0) = 2\frac{\pi}{\Lambda} \quad (TM)$$

where:
$B_L$=propagation constant of left guide,
$B_M$=propagation constant of middle guide,
$B_R$=propagation constant of right guide,
$\lambda_0$=central wavelength,
$\Lambda(TE)$=grating period of the left guide,
$\Lambda(TM)$=grating period of the right guide.

Although in the foregoing description with respect to FIGS. 2 and 3 the left guide has been designated the TE guide and the right guide the TM guide, it is to be understood that these may be reversed.

If the tunable filter (with or without gratings) is used in WDM application, the TE and TM modes are directed to photodetectors situated at the termination of each branch waveguide. The photodetectors are shown at 40, 42 in FIGS. 2 and 3. The combination of the two detected signals gives a polarization independent reading of the selected wavelength channel.

As indicated previously the central wavelength of both the TE and TM modes of the filter can be tuned by injecting electric current into the branch guides. Under a large injection current to the pn junction of the branch guides a significant spontaneous emission (SE) may occur. In FIGS. 2 and 3 a low-pass filter 44, 46 is provided in each branch guide 34, 36 between the detector 40, 42 and the filter section 35, 37. This low pass filter, in a preferred embodiment, is made simply by reverse biasing a p-n junction in the branch guides and this junction absorbs the spontaneous emission while permitting the TE and TM modes of the input signal to pass through.

With respect to the tuning function, a p-i-n junction is located in each of the branch waveguides in order to effect the refractive index change. Current injection provides a negative index change while a reverse bias providing an electro-optic or electro-refractive effect results in a positive index change. Thus, within practical limits imposed by the filter construction, material, quaternary composition, etc., it is possible to tune the filter over a broader wavelength range by combining both injection current and the electro-optic effect.

Figure 4:
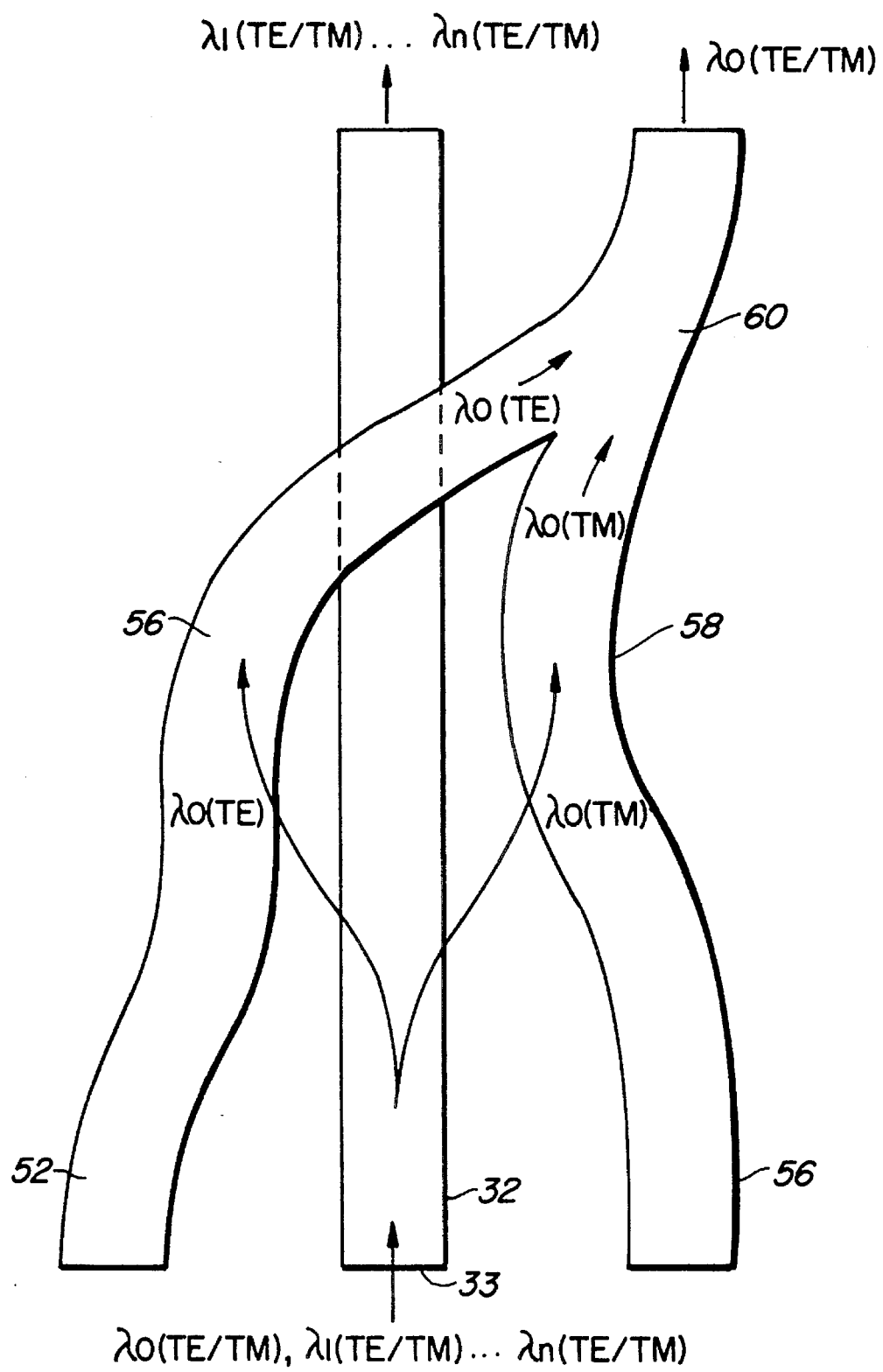
FIG. 4 is a plan view of a tunable filter with Y-branch output coupler for wavelength drop application.

If the filter is utilized in a wavelength selector/switch application, as shown in FIG. 4, the waveguides 52, 56, downstream of the filter section 56, 58 respectively, are joined by a Y-branch power combiner 60. The TE and TM modes separated by the tunable filter section 56, 58 are reunited in phase in the combiner 60 as a polarization independent optical signal for subsequent processing.

In the previous description the coupled waves in the branch guides travel in the same direction as the signal in the central or launch guide; i.e., the waves are codirectional. In this configuration the bandwidth of the wave coupled from the central guide to one of the branch guides is given by:

$$\Delta\lambda \propto \frac{1}{\frac{dB_1}{d\lambda} - \frac{dB_2}{d\lambda}}$$

where $\Delta\lambda$=bandwidth,
$B_1$ and $B_2$ are the propagation constants of the two guides. (See Marcuse, D., "Bandwidth of Forward and Backward Coupling Directional Couplers", Journal of Lightwave Technology, Vol. Lt. 5, No. 12, December 1987 at page 1773.)

Figure 5:
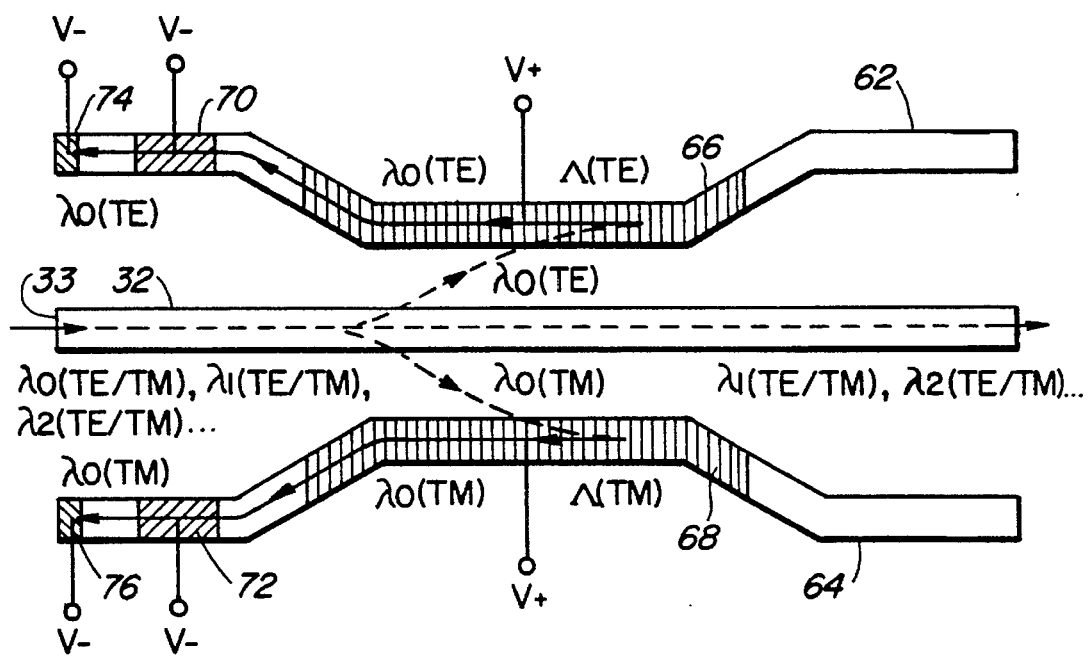
FIG. 5 is a plan view of a contradirectional, tunable filter/receiver.

It is possible, however, to utilize gratings on one or both guides to couple the wave from the central guide to a branch guide and have the coupled wave travel in the backward direction, i.e., the waves are contradirectional. A contradirectional tunable filter is illustrated in FIG. 5. The signal containing $\lambda_0(TE/TM); \lambda_1(TE/TM) \ldots \lambda_n(TE/TM)$ is launched into the central guide 32 as in the previously described structure. The branch waveguides 62, 64 are provided with gratings 66, 68 respectfully, the periods of which are dependent on the mode to be coupled. The $\lambda_0(TE)$ guide 62 has period $\Lambda(TE)$ and the $\lambda_0(TM)$ guide 64 has period $\Lambda(TM)$. These are chosen approximately as:

$$B_{62}(TE) + B_{32}(TE) = \frac{2\pi}{\Lambda(TE)}$$

and $$B_{64}(TM) + B_{32}(TM) = \frac{2\pi}{\Lambda(TM)}$$

i.e., $$\Lambda(TE) = \frac{2\pi}{B_{62}(TE) + B_{32}(TE)}$$

and $$\Lambda(TM) = \frac{2\pi}{B_{64}(TM) + B_{32}(TM)}$$

The bandwidth $\Delta\lambda$ in the contradirection mode is given by:

$$\Delta\lambda \propto \frac{1}{\frac{dB_1}{d\lambda} + \frac{dB_2}{d\lambda}}$$

Comparing the bandwidth formula for the codirectional and contradirectional configurations, it will be apparent that since in the contradirectional orientation the terms $$\frac{dB_1}{d\lambda}$$

and $$\frac{dB_2}{d\lambda}$$

are added the sum will be greater than for a codirectional coupler and hence the reciprocal will be smaller. Thus, if a narrow bandwidth is a requirement, the contradirectional filter is superior to the codirectional structure.

As shown in FIG. 5, the selected mode, i.e., TE or TM of the central wavelength $\lambda_0$ is coupled to the appropriate branch guide and reflected backwards along the branch guide. A low-pass filter 70, 72 and a detector 74, 76 as previously discussed are formed integrally with each branch guide to permit detection of the $\lambda_0$(TE) and $\lambda_0$(TM) modes. The non-coupled frequencies, i.e., $\lambda_1$; $\lambda_2$; ... $\lambda_n$ are permitted to continue along the central waveguide 32. It is to be understood, of course, that the two branch waveguides can be combined as shown in FIG. 4 utilizing a Y-branch power combiner 60.

Figure 6:
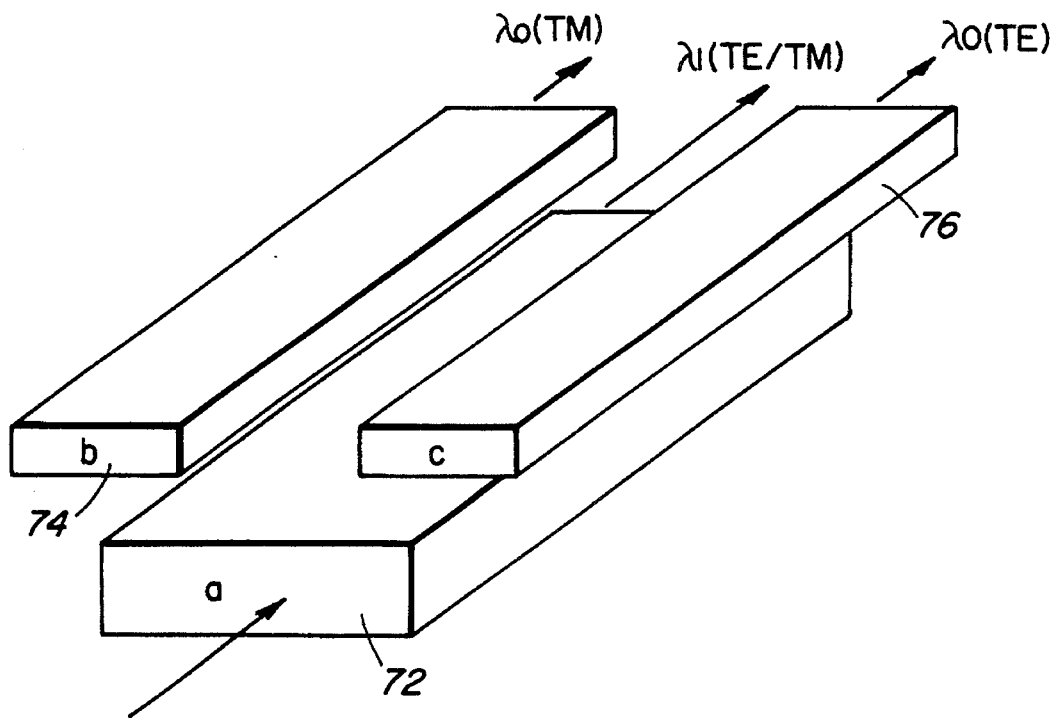
FIG. 6 is a perspective view of a vertically coupled tunable filter.

FIG. 6 is a perspective representation of a vertically coupled tunable filter. Central or feed waveguide 72 is shown to be larger than branch guides 74 and 76 which are of approximately equal size. Feed guide 72 is supplied with an optical signal containing $\lambda_0$(TE/TM), $\lambda_1$(TE/TM), ... $\lambda_n$(TE/TM). According to the previously discussed coupling effect $\lambda_0$(TM) is coupled to branch guide 74 and $\lambda_0$(TE) is coupled to branch guide 76. $\lambda_1$(TE/TM) ) ... $\lambda_n$(TE/TM) pass through central guide 72 of the filter and may be coupled to subsequent filters (not shown) for separation of $\lambda_1$(TE) and $\lambda_1$(TM), etc.

Figure 7:
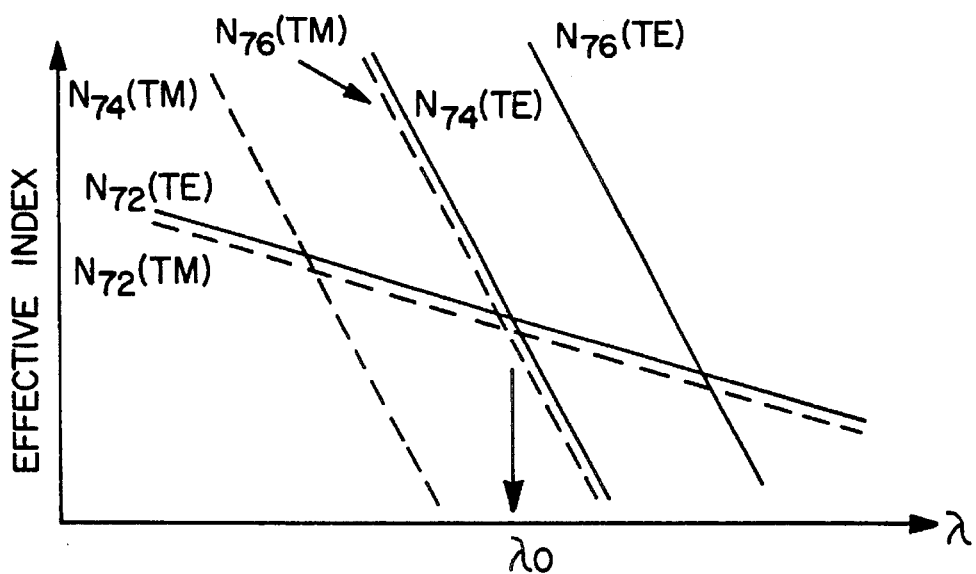
FIG. 7 is a graph of the effective index vs. wavelength of the device of FIG. 6.

The effective refraction index N of the three waveguides 72, 74 and 76 as a function of wavelength $\lambda$ is shown in FIG. 7. In this figure, $$N = B/\frac{2\pi}{\lambda}$$

where B=propagation constant.

Figure 8:
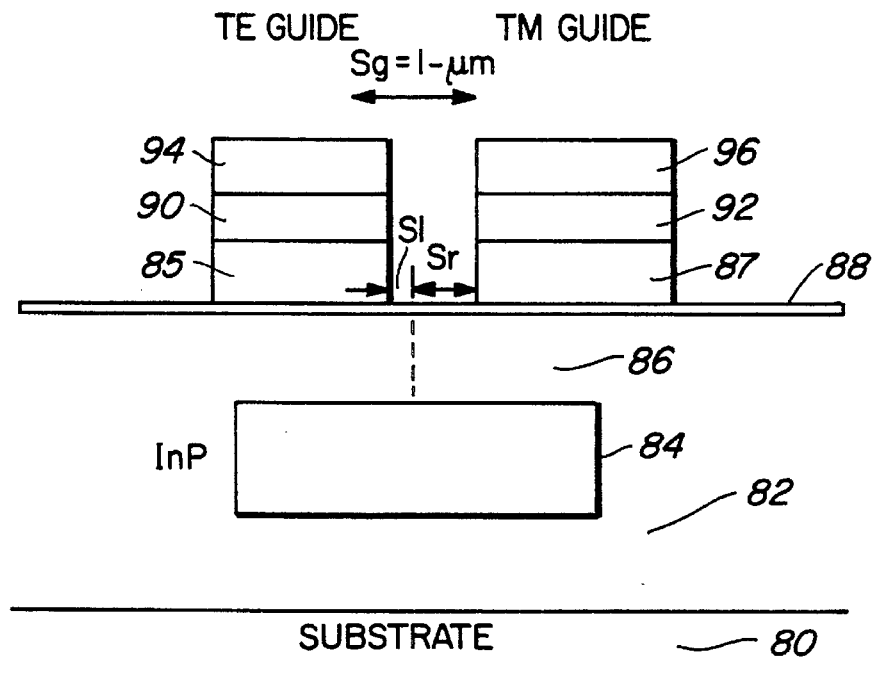
FIG. 8 is a cross-sectional view of vertically coupled filter wherein waveguides have different widths.

The solid lines in FIG. 7 give the relationship of N vs. $\lambda$ for the TE modes for each waveguide while the dashed line shows the same relationship for the TM modes. At $\lambda_0$ $N_{74}TE = N_{72}TE$ and $N_{76}TM = N_{72}TM$ As discussed previously the difference in propagation constant as between each branch guide can be achieved by various means. In FIG. 8 the difference is obtained by a difference in waveguide width. This figure is a pictorial cross-section of the filter section of a tunable filter device. The structure comprises a substrate 80, a lower cladding layer 82, a lower or central waveguide 84, a lower separation layer 86, upper separation layers 85, 87, the two portions being separated by etch stop layer 88. The upper or branch guides 90, 92 are positioned on separation layers 85, 87 respectively. Upper cladding layer 94, 96 is situated on top of branch guides 90, 92, respectively. As shown the branch guides 90, 92 as well as cladding layers 94, 96 and separation layer 85, 87 are etched in ridge form with isolation gap 97 therebetween. In this example the right or TM guide is 2.2 µm wide and the left or TE guide is 2.0 µm wide. The lower or central guide is 3.0 µm. The guide layers are formed of InGaAsP with the central guide having $\lambda g = 1.1$ µm and the branch or upper guides having $\lambda g = 1.4$ µm. These dimensions and compositional values are meant to be examples only and not intended to limit the scope of the invention.

In addition to InGaAsP/InP the tunable filter may be fabricated in other III–V alloys such as AlGaAs/GaAs or II–IV alloys or Si/Ge or other hetero-material systems. Also LiNbO$_3$, polymers, silica or glass materials may be used, as well as other photorefractive materials, and acousto-optical and electro-optic materials.

Figure 9:
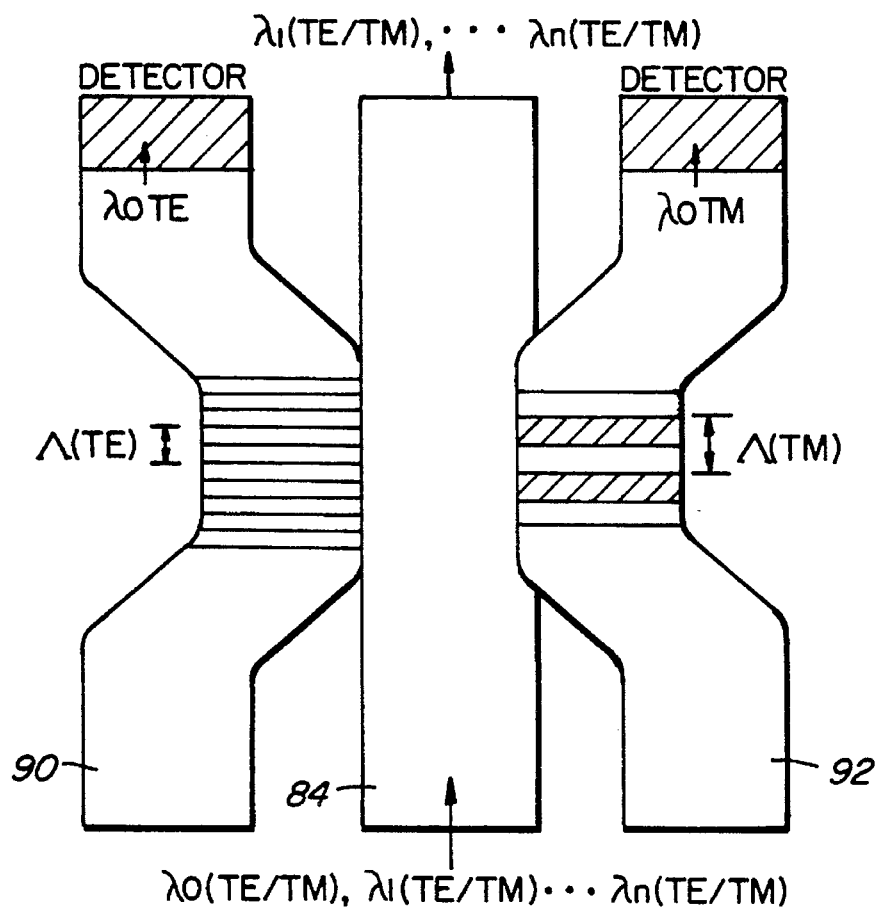
FIG. 9 is a plan view of a tunable filter/detector in which branch-guides have gratings.

FIG. 9 illustrates a further method of selectively coupling a particular wavelength from the central guide to one of the branch guides. In this case, as previously described, the branch guides 90, 92 are of different widths. One or, as shown, both of the branch guides is configured with etched gratings which satisfies the following conditions:

$$B_2 - B_1 = \frac{2\pi}{\Lambda}$$

where:
B$_2$=propagation constant of the symmetric mode of the coupler, which is close to the individual waveguide mode of one branch guide when the separation between the two waveguides is large, B$_1$=propagation constant of the anti-symmetric mode, which is close to the individual central guide mode when the separation between the two waveguides is large, and 0Λ=the length of one period of the diffraction grating.

When this condition is met, complete power exchange between the central or feed waveguide and the relevant branch guide occurs. Since the value of B2 and B1 is dependent on the refractive index of the guides, these values may be changed electro-optically by injecting current into the relevant branch guide. Similarly by simultaneously injecting the appropriate current into both branch guides, both polarization modes TE and TM of a central wavelength can be coupled into the designated branch guides.

In FIG. 9, the filter has grating assisted coupling from the central or feed guide 84 into the TE and TM guides 90, 92 respectively. As indicated the optical signal containing polarized central wavelengths $\lambda_0, \lambda_1, \lambda_2 \ldots \lambda_n$ is launched into the central guide 84 and the TE and TM modes of a first central wavelength $\lambda_0$ are coupled to the appropriate branch guides 90, 92. Central wavelengths $\lambda_1, \lambda_2 \ldots \lambda_n$ continue through the central guide 84.

As indicated previously, the system according to the present invention has flexibility with respect to the manner in which the difference in propagation constants between the waveguides is achieved. This can be through compositional differences, differences in widths, or differences in thickness.

Figure 10:
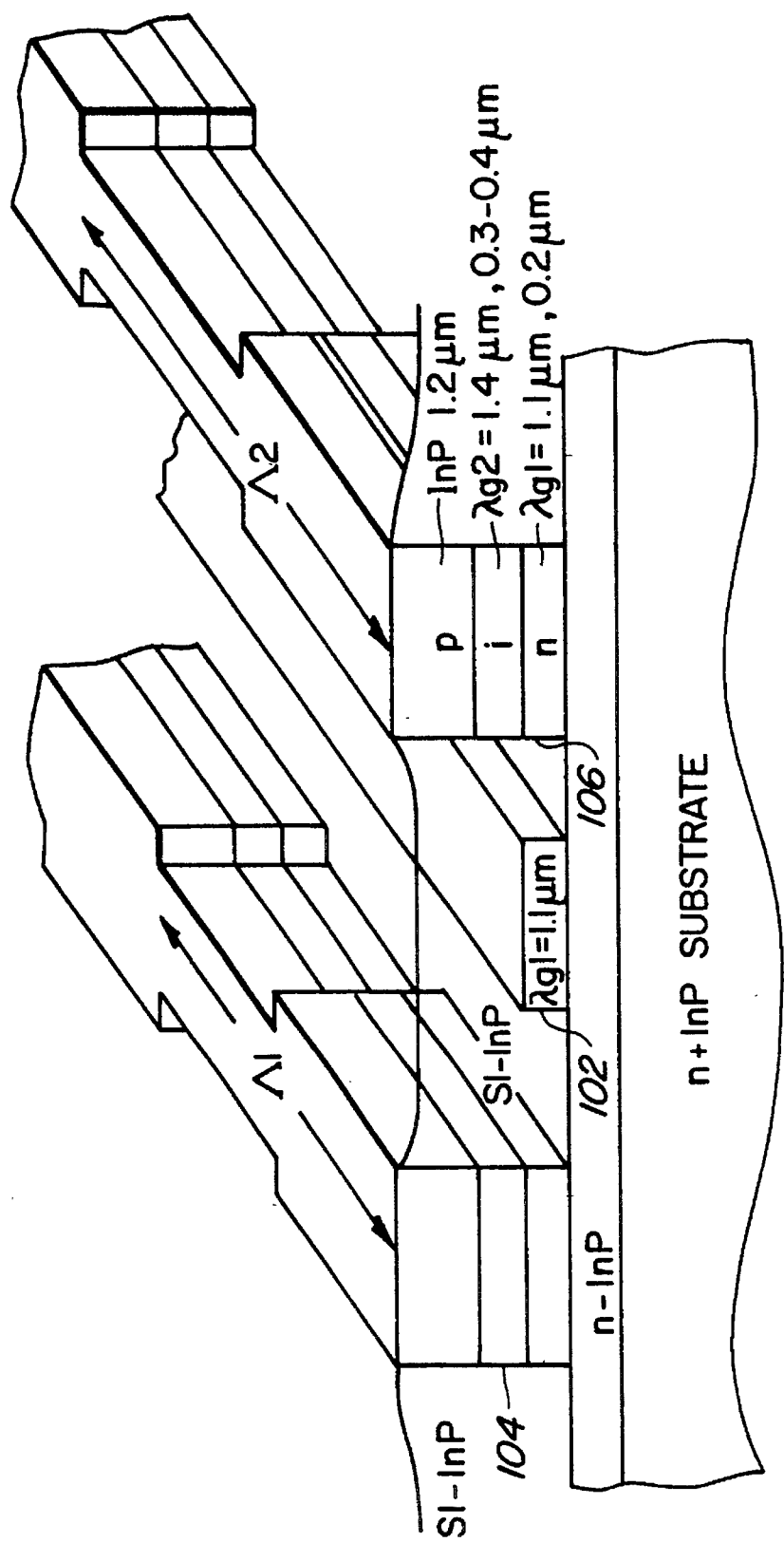
FIGS. 10–12 are views of laterally coupled filters showing various sections of the device.

It is also within the scope of this invention to physically locate the waveguides such that the coupling occurs laterally rather than vertically as described previously. Laterally coupled waveguides are illustrated in FIG. 10 wherein the central or feedguide 102 is located on the same plane but separated laterally from the left and right branch waveguides 104, 106 respectively.

Figure 11:
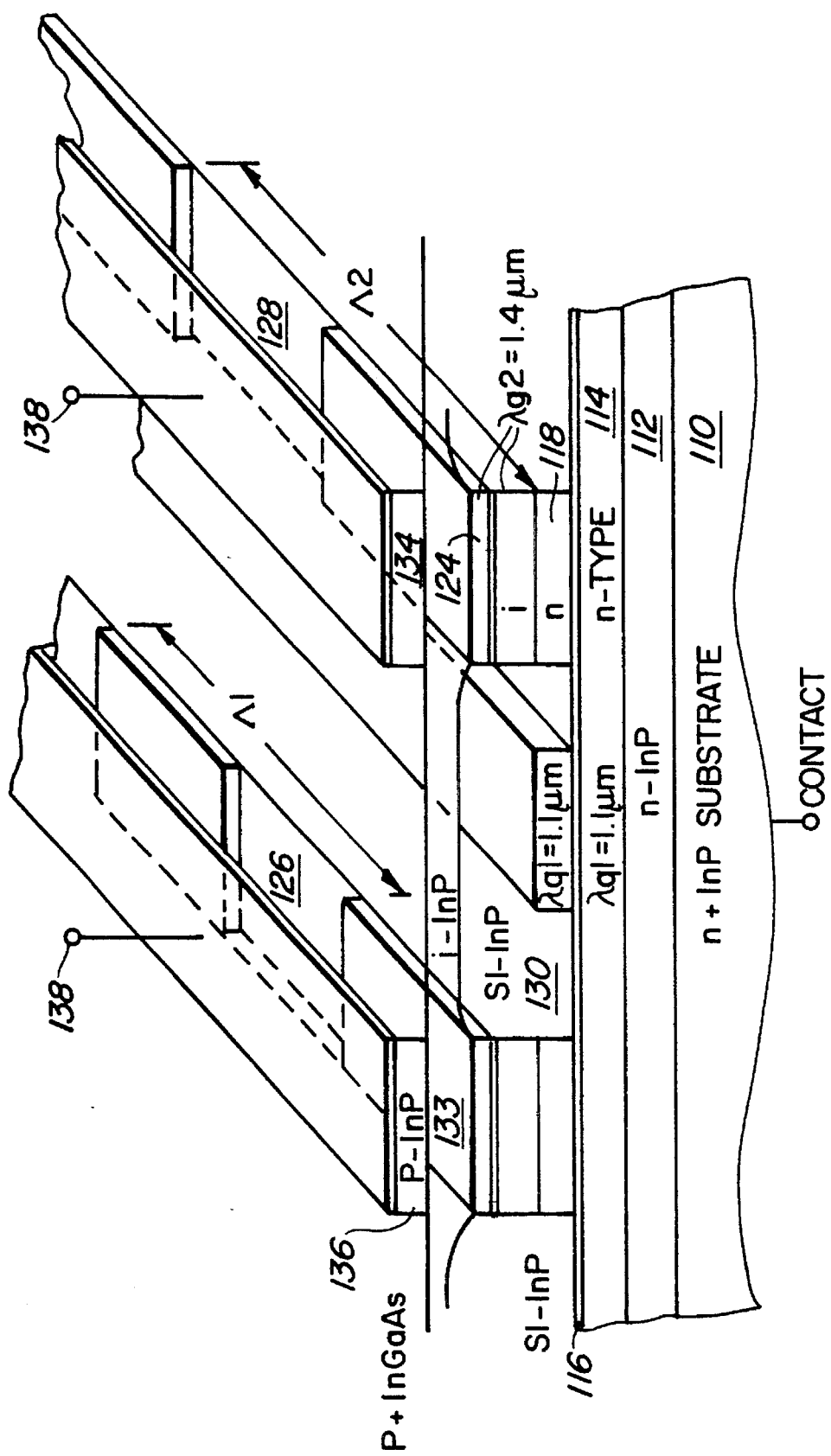
Figure 12:
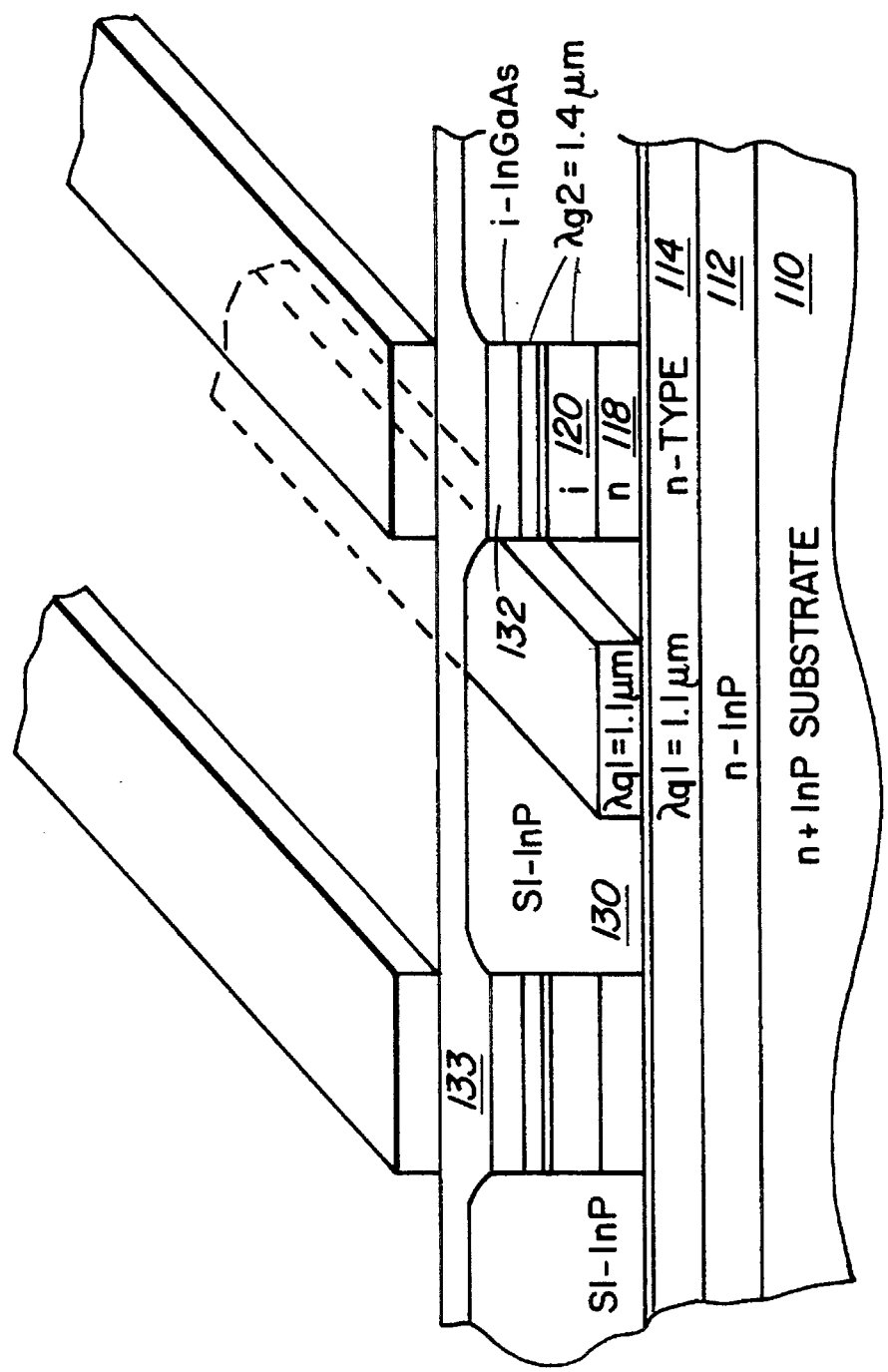

FIGS. 11, 12, 13 and 14 also relate to a polarization independent tunable filter having laterally coupled waveguides. FIG. 11 illustrates the tuning section of a filter of the type generally shown in cross-section in FIG. 13. FIG. 11, which is a perspective view of the tuning section, shows the various layers of the structure which make up the device. The layers are grown by crystal growth techniques such as MOCVD on a n$^+$ InP substrate 110. The first layer 112 is an n-type InP buffer followed by an InGaAsP ($\lambda q = 1.1$ µm) layer 114, which functions as the cladding layer for the branch guides, and part of the central-guiding layer. Preferably a thin etch stop layer 116 is then grown followed by a layer 118 of InGaAsP ($\lambda q=1.1$ µm) which is selectively etched to form the central waveguide and part of the cladding layer for the lateral TE and TM branch guides. A higher index guide layer 120 is grown to form the branch guides. As shown layer 120 is unintentionally doped InGaAsP ($\lambda q=1.4$ µm) on which is grown a thin space layer 122 and a thin grating layer 124 of InGaAsP ($\lambda q=1.4$ µm). The structure is then etched to form the gratings 126, 128. Semi-insulating InP 130 is regrown between the waveguides and on either side of the branch guides. This is grown to a sufficient height to be on the same plane as the gratings or above it as a current block layer. Subsequently a layer 133 of unintentionally doped InP is grown on the semi-insulating layer followed by p-type InP 134 and a P-contact layers 136 of p+ InGaAs. The p-InP and contact layers are etched so as to form ridges over the branch waveguides. P contacts 138 and n contact (not shown) are formed in a known manner.

The detector section (FIG. 12), which is formed at the same time as the tuning section, has substantially the same structure as the tuning section with the exception that an unintentionally doped InGaAs layer 132 is added between the InGaAsP layer 124 on the space layer 122 and the unintentionally doped InP layer 133. This can be seen in FIG. 12. The unintentionally doped InGaAs layer 132, together with the adjacent InP 133, as well as the upper p-InP and p+ InGaAs contact layer creates a PIN photodiode to detect the optical energy in the waveguide.

Figure 13:
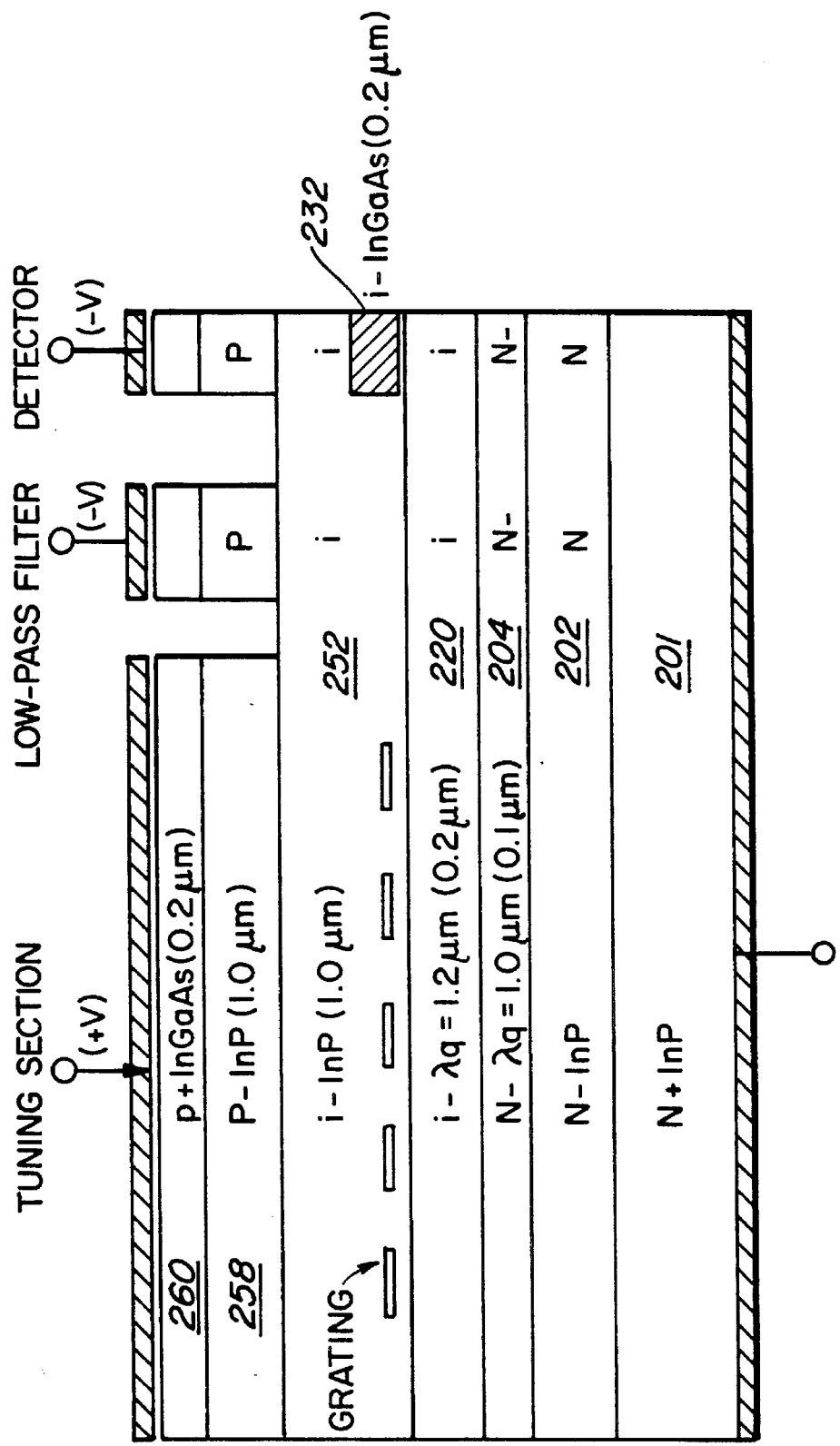
FIGS. 13 and 14 illustrate a laterally coupled filter/receiver wherein the waveguides have different compositional ratios.
Figure 14:
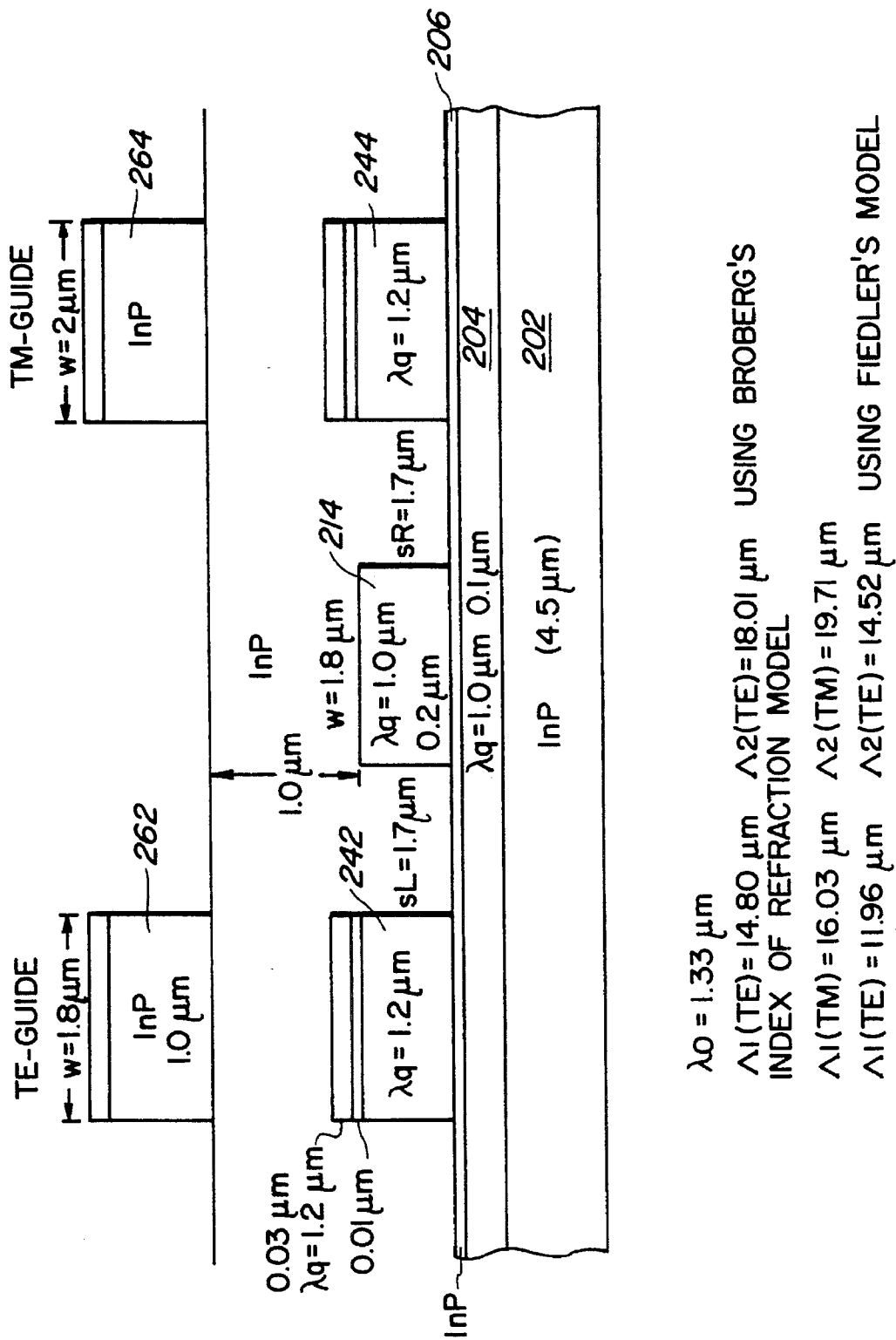

FIG. 13 is a longitudinal cross-sectional view of the branch guide of the tunable filter illustrating the tuning, low-pass filter and detector sections. In the previous description, with respect to FIGS. 10 to 12, the central waveguide and the branch guides are part of the same layer and hence have the same compositional values. FIG. 14 is a cross-sectional view of a filter having laterally coupled waveguides wherein the central guide has a different composition than the branch guides. FIG. 13 is a longitudinal view of the device of FIG. 14.

Figure 15:
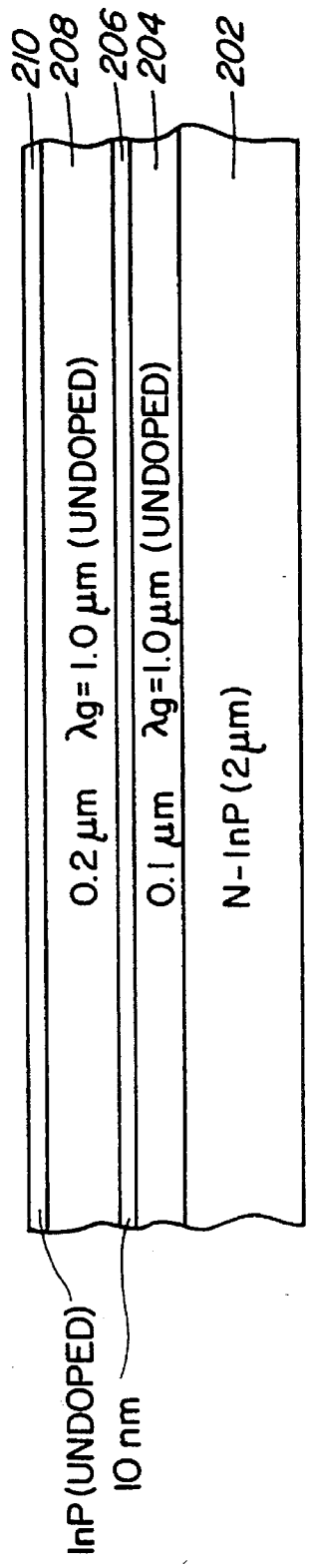
FIGS. 15 to 26 illustrate the fabrication sequence of a polarization independent tunable filter/receiver according to one aspect of the invention.
Figure 16:
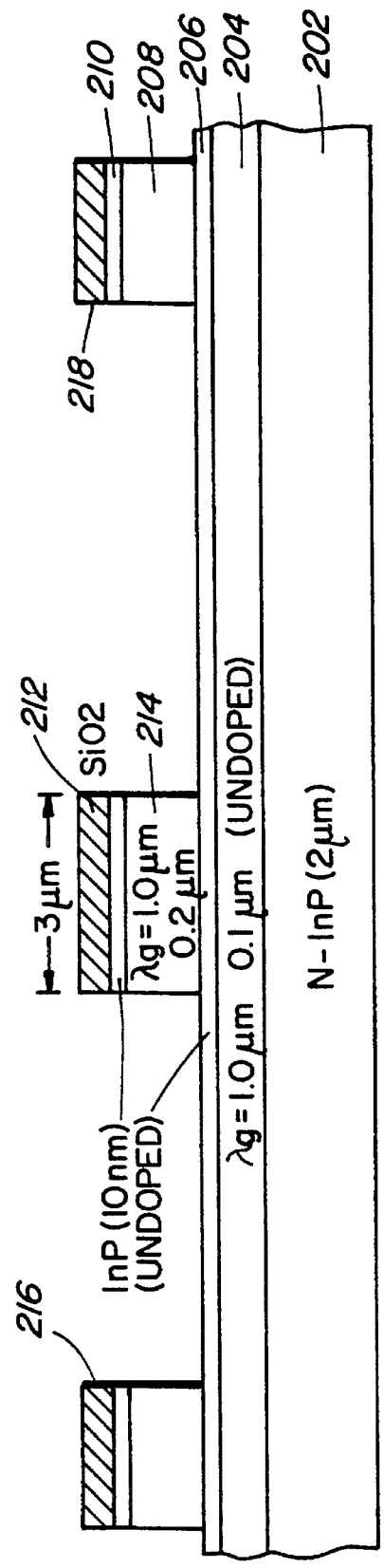
Figure 17:
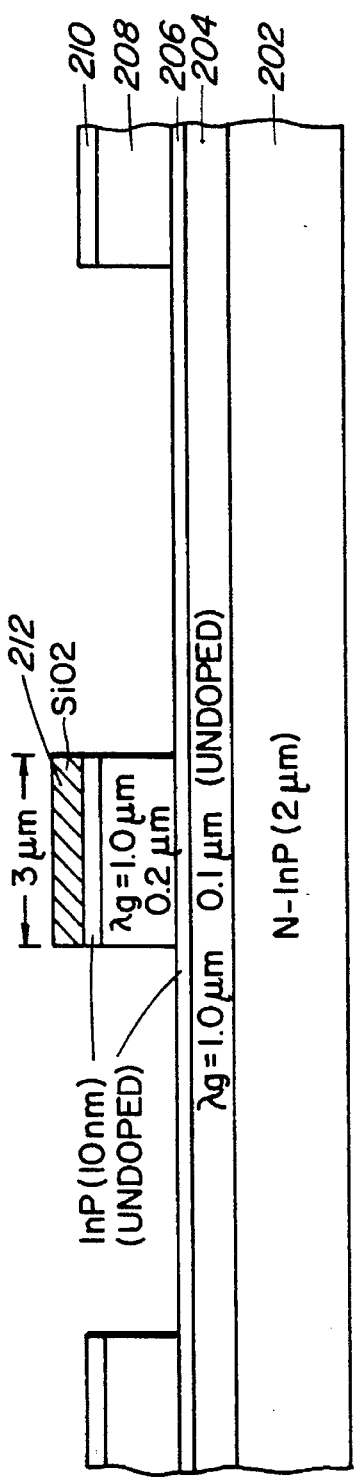

FIGS. 15 to 26 provide pictorially and in greater detail the processing sequences required to fabricate the laterally coupled tunable filter shown in FIGS. 13 and 14. With reference to FIG. 15, a 2 µm layer 202 of N-type InP is grown on an N-type InP substrate (not shown). The 2 µm layer 202 is followed by a 0.1 µm layer 204 of undoped InGaAsP having a bandgap $\lambda g=1.0$ µm. Next a 10 nm undoped InP etch stop layer 206 is grown followed by a 0.2 µm thick layer 208 of undoped InGaAsP also having a bandgap $\lambda g=1.0$ µm and a second 10 nm etch stop layer 210 of undoped InP. A layer 212 of $S_iO_2$ is deposited on top of the etch stop layer 210 and the $S_iO_2$ is patterned photolithographically in the configuration of the central waveguide 214. $S_iO_2$ is also left on either sides 216, 218 of the central waveguide 214 to define the outer edges of the filter. The material between the $S_iO_2$ masks is etched down to the first etch stop as shown in FIG. 16. Next the $S_iO_2$ is removed from the two side patterns as shown in FIG. 17.

Figure 18:
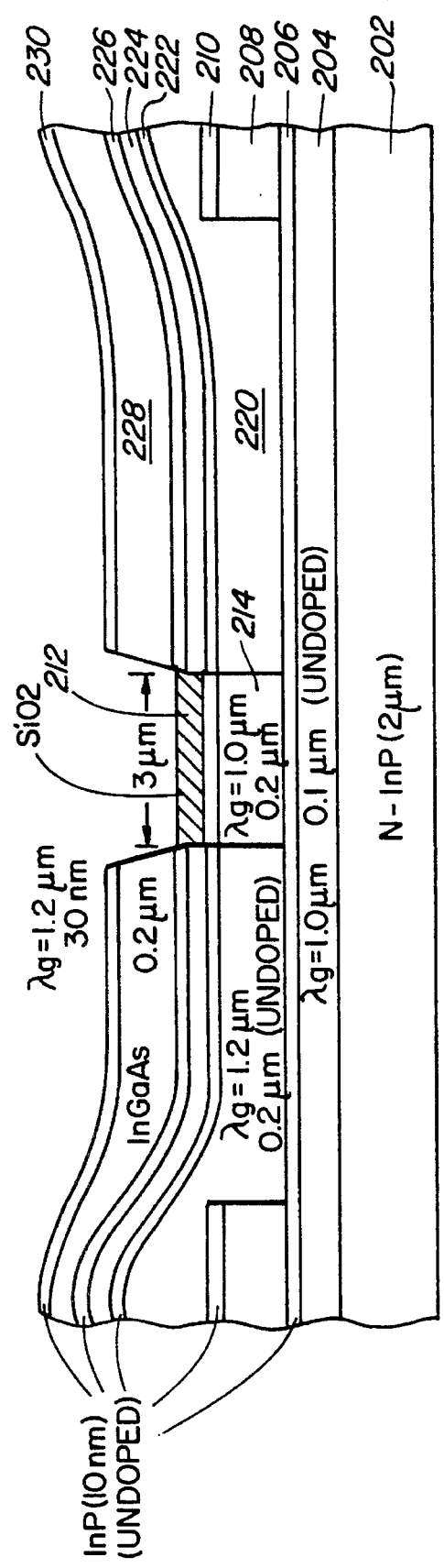
Figure 19:
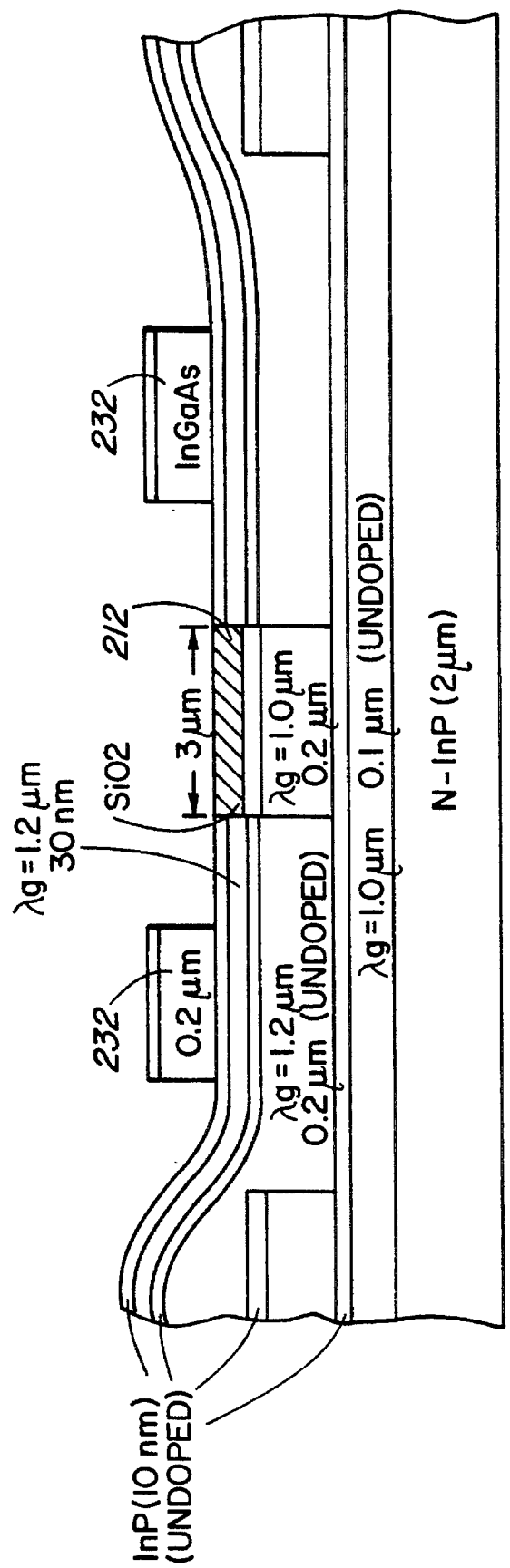

The structure is then regrown with the additional layers shown in FIG. 18. These include a 0.2 µm layer 220 of undoped InGaAsP having a bandgap $\lambda g=1.2$ µm, an etch stop layer 222, a 30 nm thick layer 224 of InGaAsP having a $\lambda g$ of 1.2 µm, a further etch stop 226, a 0.2 µm thick layer 228 of undoped InGaAs and finally a top etch stop 230. The photodetectors 232 shown in FIGS. 13 and 19 are formed in the InGaAs layer utilizing photolithographic techniques and $S_iO_2$ passivation (not shown). This results in two detectors 232 approximately 3 µm wide and 50 µm long (FIG. 19).

Figure 20:
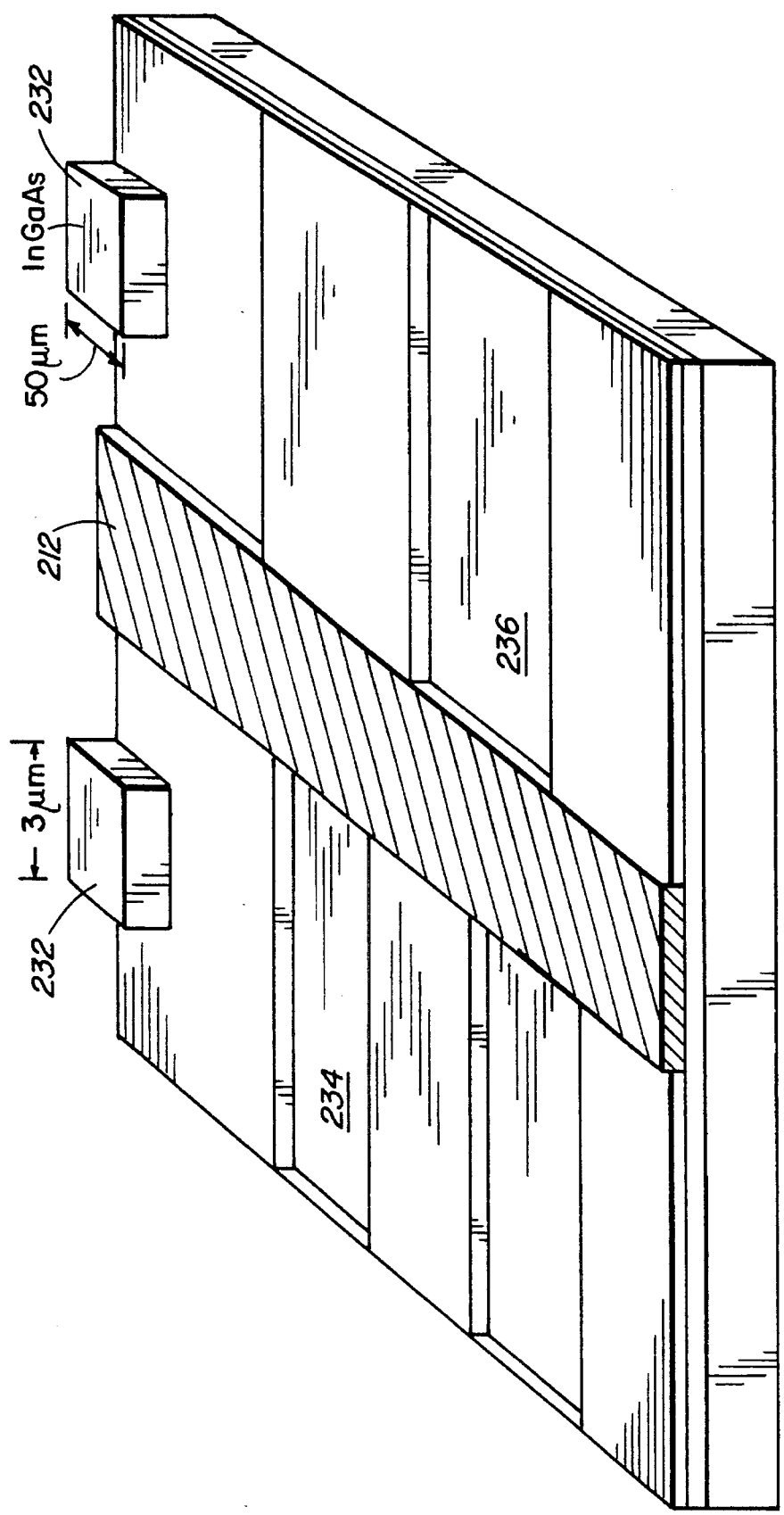

The material on either side of the central waveguide, excluding the detector section, is etched to produce the grating patterns 234, 236 illustrated in FIG. 20.

Figure 21:
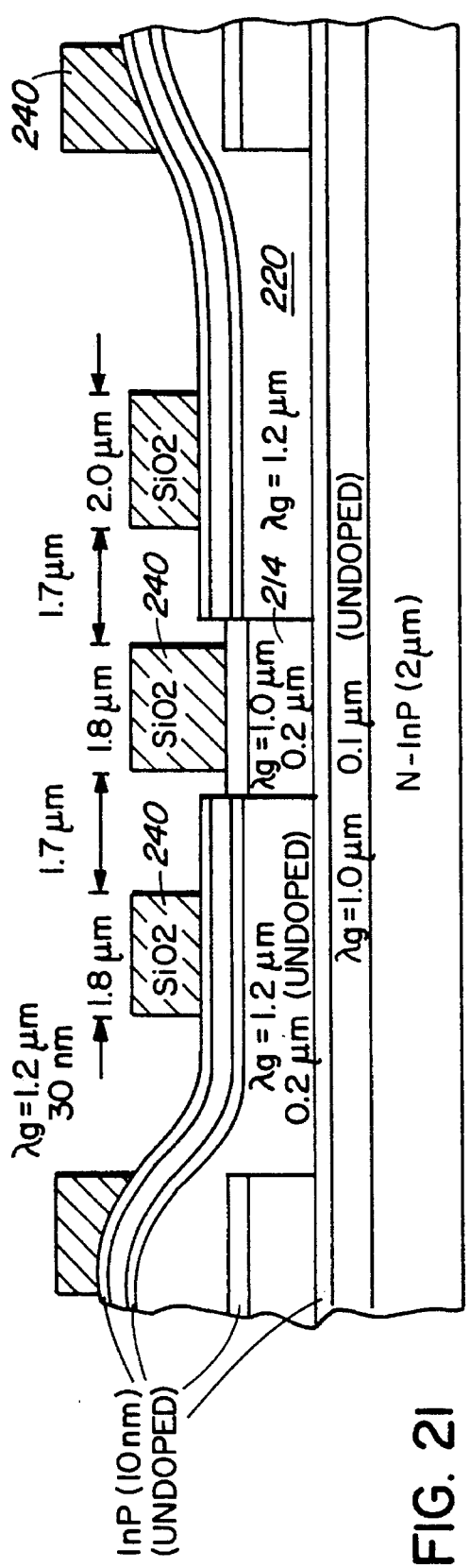
Figure 22:
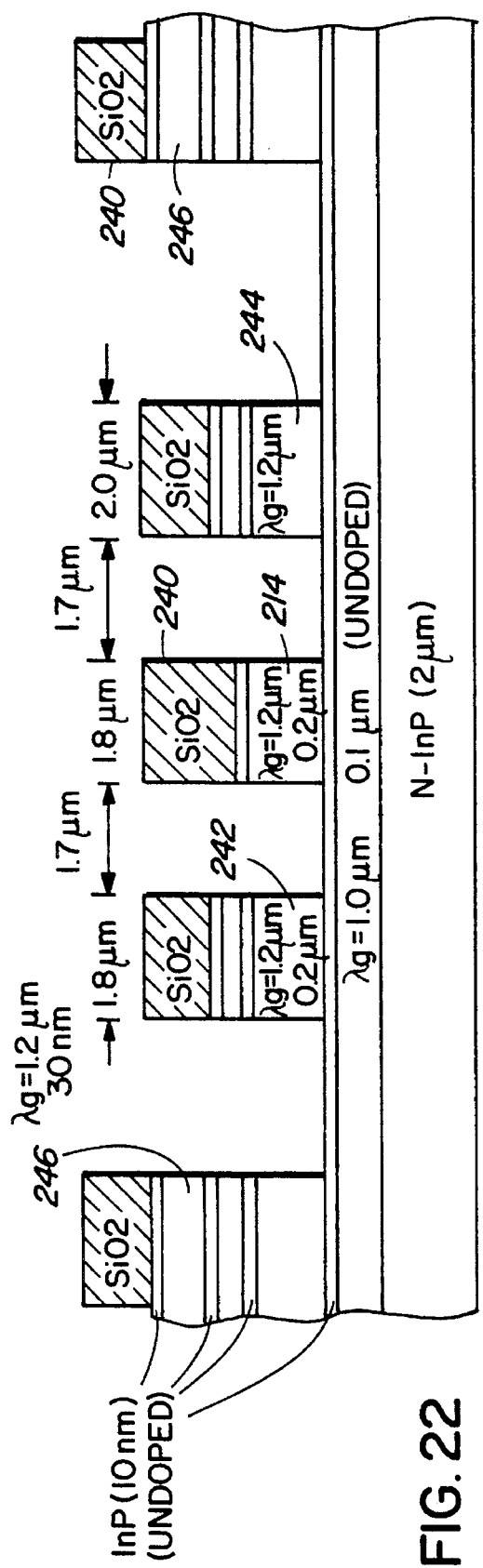
Figure 23:
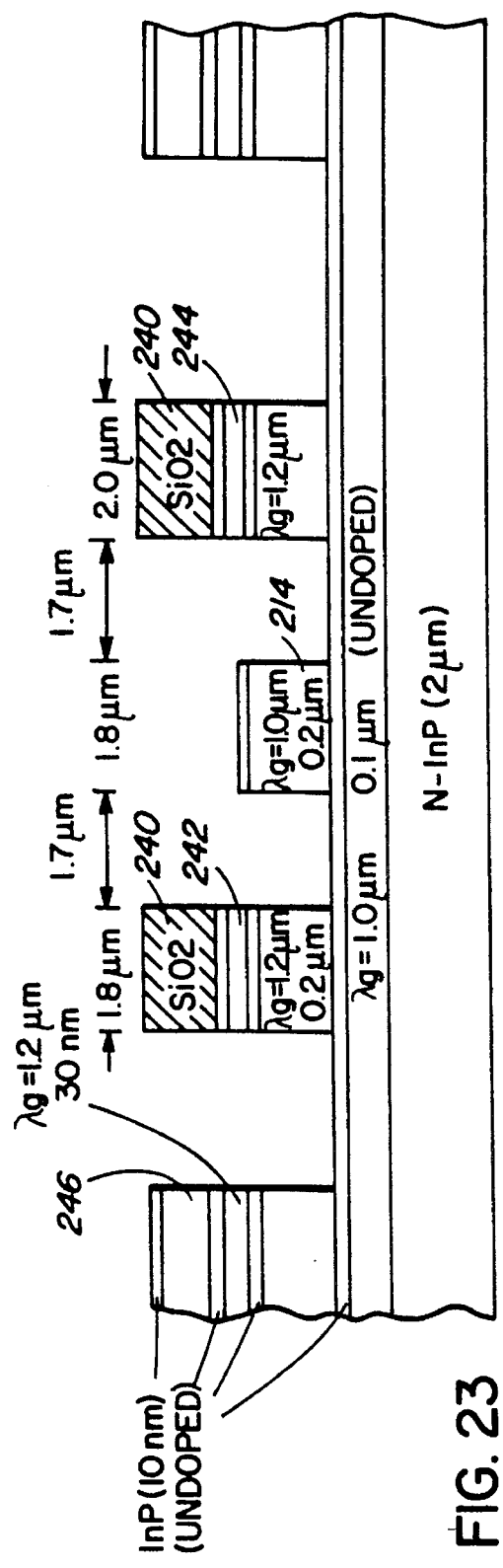
Figure 24:
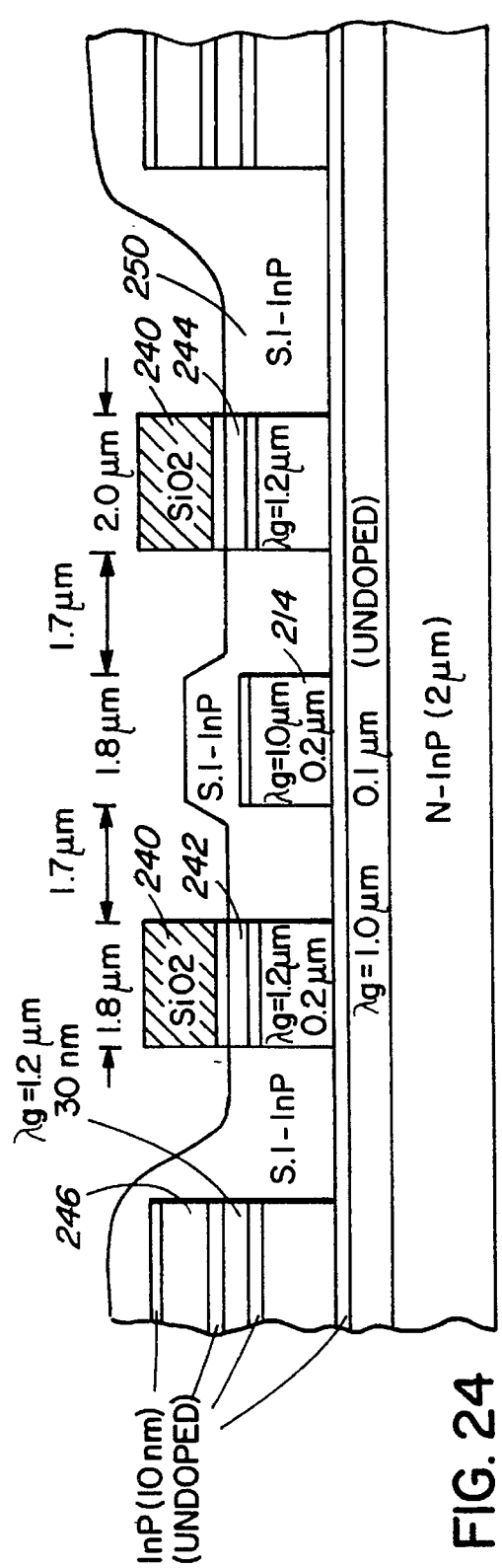

Next the pattern for the central waveguide and the first and second branch waveguides are formed in an $S_iO_2$ layer 240 as shown in FIG. 21. The detectors 232 previously shown in relation to FIG. 19 are incorporated into the branch waveguide patterns. The material is then etched to form the waveguides 242, 244 as shown in FIG. 22. The edge pattern 246, 248 is also left to define the outer limits of the filter and protect the ridge guides. The dimensions of the three guides are as shown in FIG. 22, namely, 1.8 µm for left branch, 1.8 µm for central guide, and 2.0 µm for right guide. The gaps between each branch guide and the central guide is 1.7 µm. As shown, however, the composition of the branch guides is different than the composition of the central guide, i.e., $\lambda g=1.2$ µm vs. $\lambda g=1.0$ µm. The $S_iO_2$ is then removed from the central waveguide 214 and outer edge defining 246, 248 patterns as shown in FIG. 23.

Figure 25:
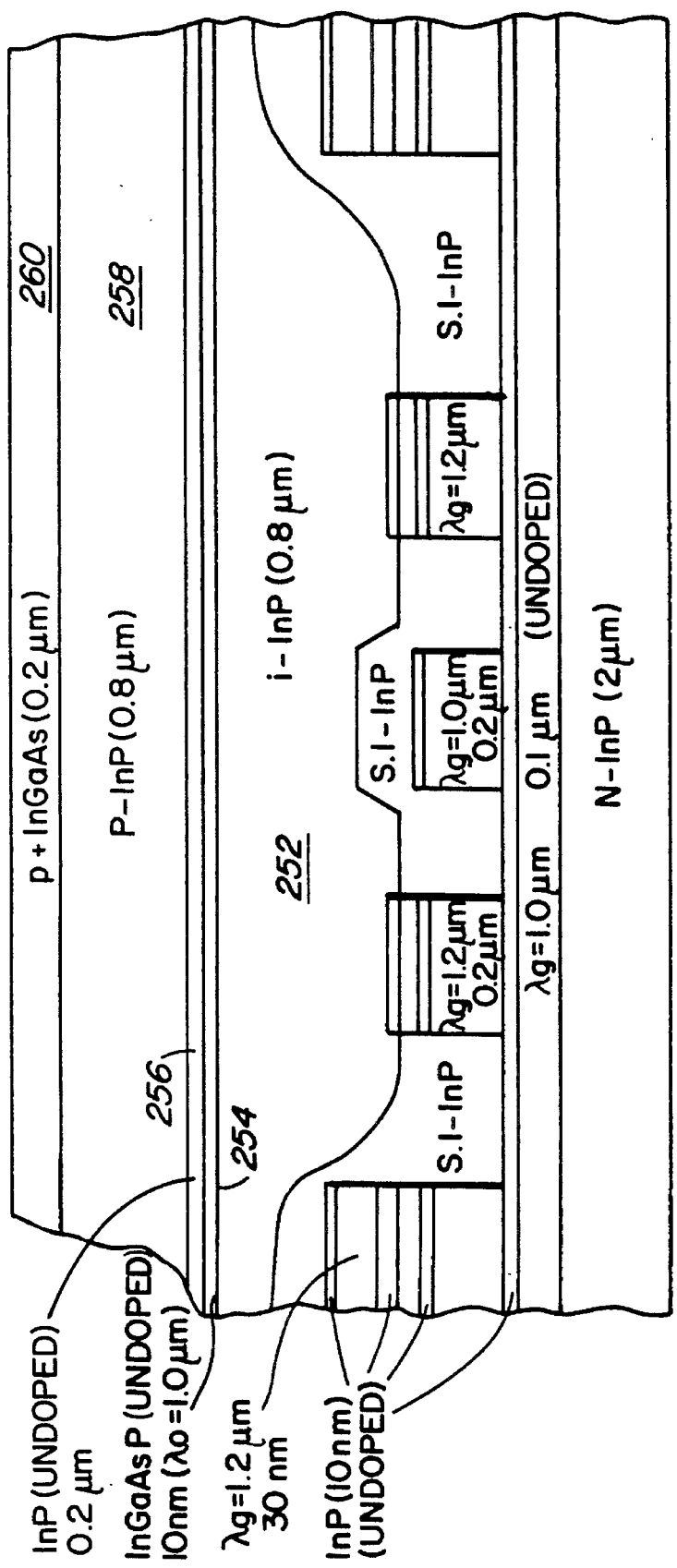
Figure 26:
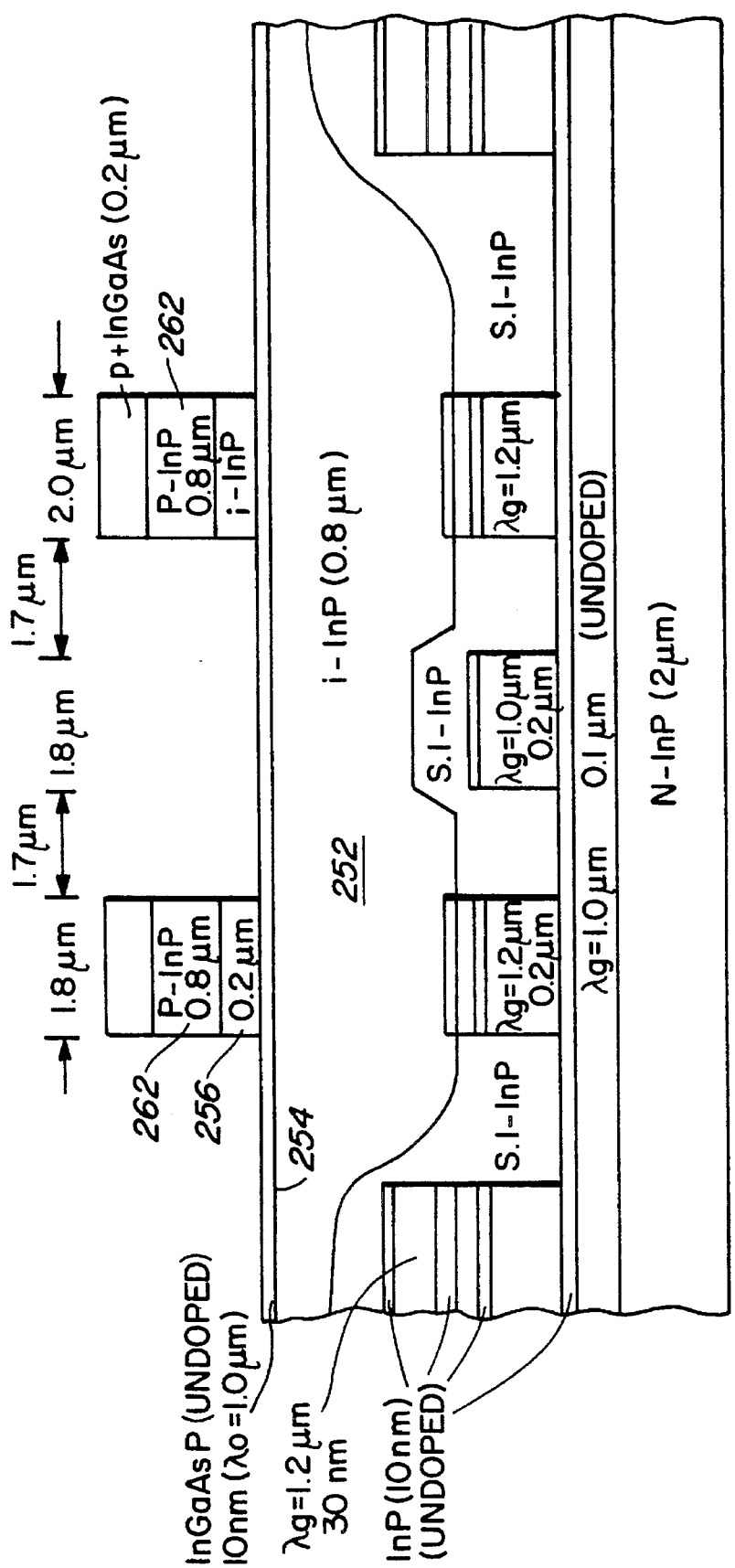

As a third growth step a layer 250 of semi-insulating InP is grown between the waveguides 214, 242, 244 and between the branch guides 242, 244 and the periphery 246, 248. This is shown in cross-section in FIG. 24. The $S_iO_2$ is then removed from the top of the branch waveguides 242, 244. Next, a fourth growth step adds a 0.8 µm layer 252 of intrinsic InP, followed by a 100 Å layer 254 of InGaAsP ($\lambda g=1.0$ µm) and a 0.2 µm layer 256 of intrinsic InP and then a 0.8 µm layer 258 of P-type InP and finally a contact layer 260 of P$^+$ InGaAs 0.2 µm thick. This is shown in FIG. 25.

Finally, the material above the 100 Å InGaAsP layer is etched so as to leave ridges 262, 264 in the configuration of the branch waveguides. Contacts (not shown) are, of course, incorporated into the ridges in a known manner. The final structure is shown in cross-section in FIG. 26.

The foregoing processing sequence refers specifically to the III–V alloy, InGaAsP/InP. As indicated previously, tunable filters according to the present invention can be fabricated from other materials and the processing steps will naturally differ depending on the material choice. The InGaAsP/InP system has been described in detail because it is one of the more preferred choices and the processing sequences are more in line with well developed semiconductor fabrication procedures. The above described processing sequence is just an example and is not intended to limit the scope of the invention.

Figure 27:
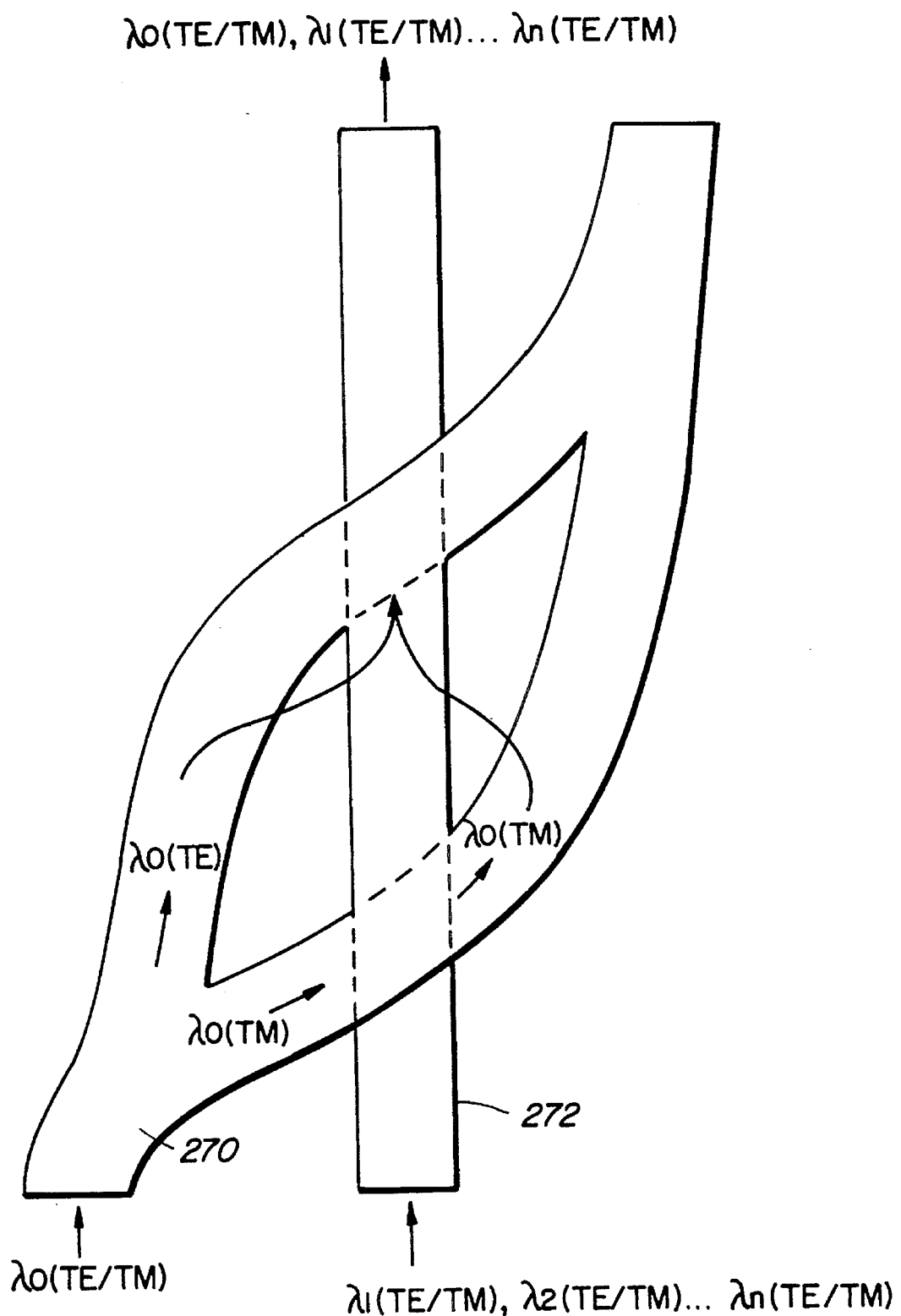
FIG. 27 is a plan view of a 2×2 tunable filter for wavelength add application.
Figure 28:
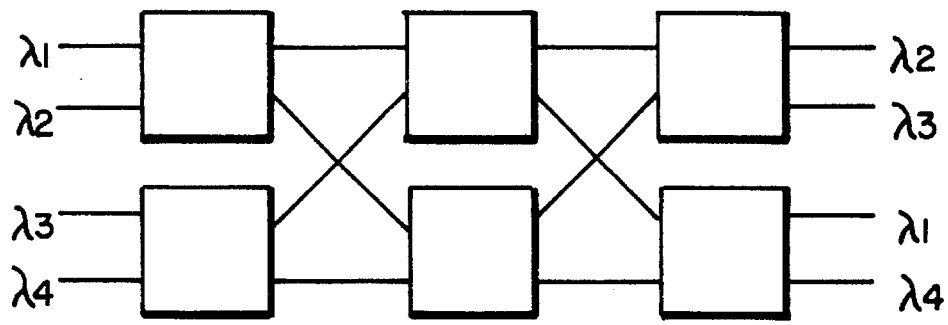
FIG. 28 is a block diagram of a 2×2 wavelength selection coupler for Benes network application.
Figure 29:
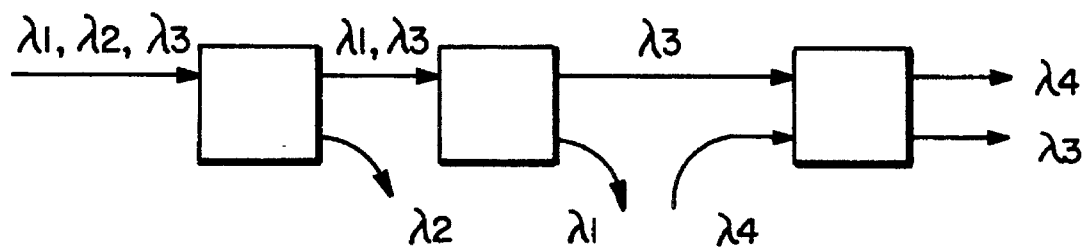
FIG. 29 is blank diagram of a 2×2 selection coupler according to a further embodiment for wavelength drop and add application.

Although a significant application for the tunable filter of the present invention is to selectively couple the TE and TM modes of a central wavelength from the feedguide to branch guides, the device is also capable of adding wavelength channels from two-input waveguides to a single output waveguide. This is illustrated in FIG. 27 in which polarization independent channel $\lambda_0$ is launched into a first waveguide 270 and wavelength channels $\lambda_1, \lambda_2 \ldots \lambda_n$ are launched into a second guide 172. The tunable filter is operated to add the $\lambda_0$ channel onto the second guide 272 and the combination $\lambda_0, \lambda_1, \lambda_2 \ldots \lambda_n$ exits the filter. These features can support the optical switch shown in FIG. 28 and the communications network shown in FIG. 29.

Figure 30:
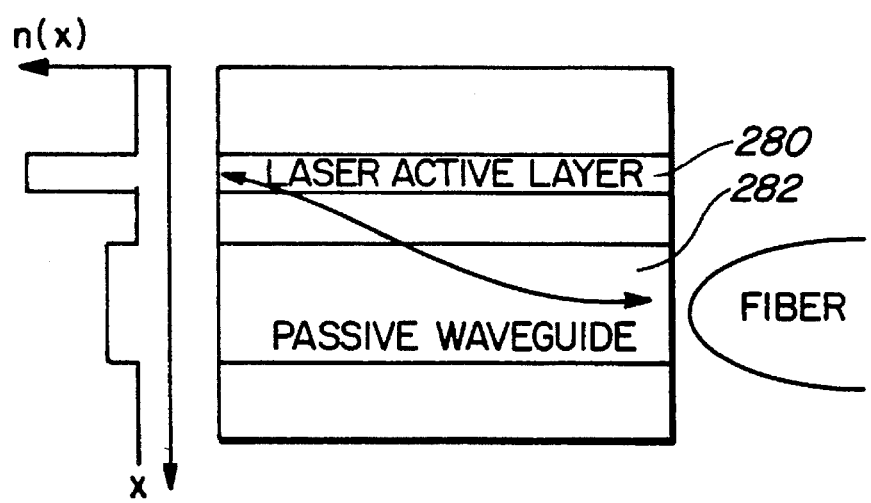
FIG. 30 is cross-sectional diagram of an integrated laser/waveguide based on the wavelength selective filter concept.

The concept of wavelength selective coupling according to the present invention can also be applied to an integrated laser and passive waveguide as shown in FIG. 30. The light generated in the narrow active region 280 is selectively coupled to the larger passive waveguide 282. This allows better coupling of the light into a fiber for optical communication.

Although specific embodiments of the invention have been illustrated and described it will be apparent to one skilled in the art that variations and alternatives to these embodiments are possible. For example, gain medium or optical amplifiers can be incorporated in either or both of the branch-guides as well as the middle feed-guide. Also the periodic gratings can be associated with one of the branch guides and the middle guides, as well as both branch guides. It is to be understood, however, that such variations and alternatives fall within the scope of the invention as defined by the appended claims.

We claim:

1. A polarization independent optical directional coupler wavelength tunable filter comprising:

a first waveguide to receive and transfer therethrough an optical signal having a plurality of wavelength channels each having transverse electric (TE) and transverse magnetic (TM) polarization modes;

a second waveguide having at least a portion thereof in juxtaposition to said first waveguide;

a third waveguide having at least a portion thereof in juxtaposition to said first waveguide; and wavelength tuning means associated with said waveguides to selectively couple said transverse electric polarization mode of one of said plurality of wavelength channels from said first waveguide to said second waveguide and to selectively couple said transverse magnetic polarization mode of said one of said plurality of wavelength channels from said first waveguide to said third waveguide.

2. A tunable filter as defined in claim 1 having a monolithic, integrated receiver in each of said second and third waveguides to absorb said transverse electric polarization mode and said transverse magnetic polarization mode of said one of said plurality of wavelength channels.

3. A tunable filter/receiver as defined in claim 2, each of the second and third waveguides having an integrated photodetector located at a position downstream from the portion in juxtaposition to the first waveguide.

4. A tunable filter as defined in claim 3, each of the second and third waveguides having an integrated low-pass filter between the photodetector and the portion in juxtaposition to said first waveguide.

5. A tunable filter/receiver as defined in claim 2, further including an optical amplifier in at least one of said first, second or third waveguides.

6. A tunable filter/receiver as defined in claim 2, said transverse electric and transverse magnetic polarization modes of said one of said plurality of wavelength channels coupled to said second and third waveguides being codirectional with said optical signal.

7. A tunable filter/receiver as defined in claim 2, said transverse electric and transverse magnetic polarization modes of said one of said plurality of wavelength channels coupled to said second and third waveguides being contradirectional to said optical signal.

8. A tunable filter as defined in claim 5, said second and third waveguides having gratings which reflect said transverse electric and transverse magnetic polarization modes of said one of said plurality of wavelength channels in opposite direction to said optical signal in said first waveguide.

9. A tunable filter/receiver as defined in claim 2, fabricated in a semiconductor material structure.

10. A tunable filter as defined in claim 9, said semiconductor structure comprising layers of III–V alloy compounds on a III–V substrate.

11. A tunable filter as defined in claim 9, said semiconductor structure comprising layers of II–VI materials.

12. A tunable filter as defined in claim 9, said semiconductor structure comprising layers of IV materials.

13. A tunable filter as defined in claim 10, said III–V alloy compound being InGaAsP and said substrate being InP.

14. A tunable filter as defined in claim 10, said III–V alloy compound being AlGaAs and said substrate being GaAs.

15. A tunable filter as defined in claim 1, fabricated in a class of electro-optic material including Lithium Niobate ($LiNbO_3$).

16. A tunable filter as defined in claim 1, fabricated in a polymer material.

17. A tunable filter as defined in claim 1, fabricated in a class of photo-refractive materials including silica and glass.

18. A tunable filter as defined in claim 1, said transverse electric (TE) and transverse magnetic (TM) polarization modes being randomly polarized.

19. A tunable filter as defined in claim 18, said wavelength tuning means including means on said second and said third waveguides to selectively inject tuning current.

20. A tunable filter as defined in claim 19, wherein the refractive index of said first waveguide is different than the refractive index of said second and third waveguides.

21. A tunable filter as defined in claim 20, wherein the difference in refractive indexes is due to a difference in composition of the material in respective waveguides.

22. A tunable filter as defined in claim 20, wherein the difference in effective refractive indexes is due to a difference in geometry between respective waveguides.

23. A tunable filter as defined in claim 22, wherein the geometric difference relates to thickness differentials between respective waveguides.

24. A tunable filter as defined in claim 22, wherein the geometric difference relates to width differentials between respective waveguides.

25. A tunable filter as defined in claim 1, wherein the length of the portion of the second and third waveguides in juxtaposition to said first waveguide is dependent on the coupling strength of the TE and TM modes to be coupled to said second and third waveguides.

26. A tunable filter as defined in claim 18, said wavelength tuning means including means on said second and third waveguide to selectively reverse bias p-n junctions therein.

27. A tunable filter as defined in claim 26, said reverse bias to said p-n junctions results in an electro-optic effect which increases the refractive index of said second and third waveguides.

28. A tunable filter as defined in claim 19, wavelength tuning means further including a periodic grating on at least one of said waveguides.

29. A tunable filter as defined in claim 19, said wavelength tuning means further including a periodic grating on each of said second and third waveguides wherein period of the gratings is different.

30. A tunable filter as defined in claim 1, wherein the separations between the first and second, first and third waveguides in the juxtaposition area are dependent on the coupling strength of the TE and TM modes to be coupled to said second and third waveguides.

31. A tunable filter as defined in claim 1, wherein the first, second and third waveguides are coplanar.

32. A tunable filter as defined in claim 1, wherein the second and third waveguides are coplanar and separated vertically from the first waveguide.

33. A tunable filter as defined in claim 1, further including Y-branch coupler uniting the second and third waveguides at a position downstream from the portion thereof in juxtaposition to the first waveguide.

34. A tunable filter as defined in claim 33, further having a Y-branch coupler uniting the second and third waveguides at a position upstream from the portion thereof in juxtaposition to the first waveguide.

* * * * *